United States Patent
Johoji et al.

(10) Patent No.: US 6,858,676 B1
(45) Date of Patent: Feb. 22, 2005

(54) OLEFIN DERIVED COPOLYMER

(75) Inventors: Hirofumi Johoji, Ichihara (JP);
Hidetake Hozumi, Ichihara (JP);
Atsuko Ogawa, Rocklin, CA (US);
Tadaaki Nishiyama, Ichihara (JP)

(73) Assignee: Sumitomo Chemical Company, Ltd., Osaka (JP)

( * ) Notice: Subject to any disclaimer, the term of this patent is extended or adjusted under 35 U.S.C. 154(b) by 1 day.

(21) Appl. No.: 10/031,333

(22) PCT Filed: Jul. 21, 1999

(86) PCT No.: PCT/JP00/04803
§ 371 (c)(1),
(2), (4) Date: May 22, 2002

(87) PCT Pub. No.: WO01/05853
PCT Pub. Date: Jan. 25, 2001

(30) Foreign Application Priority Data

Jul. 21, 1999 (JP) .......... 11-206054
Sep. 10, 1999 (JP) .......... 11-257718
Dec. 10, 1999 (JP) .......... 11-351407
Feb. 4, 2000 (JP) .......... 2000-028133

(51) Int. Cl.$^7$ .......... C08F 8/00; C08L 23/00; C08L 23/04; C08L 25/02; C08L 27/04
(52) U.S. Cl. .......... 525/191; 525/216; 525/223; 525/232; 525/240; 525/241; 526/293; 526/296; 526/308; 526/335; 526/346; 526/348.6
(58) Field of Search .......... 525/191, 216, 525/223, 232, 245, 241, 240; 526/293, 296, 308, 335, 346, 348.6

(56) References Cited

U.S. PATENT DOCUMENTS 6,140,441 A 10/2000 Takashi et al.
6,506,839 B1 * 1/2003 Nishihara et al. .......... 525/191
6,562,907 B2 * 5/2003 Johoji et al. .......... 525/191

FOREIGN PATENT DOCUMENTS

JP A-08-183813 7/1996
WO WO97/45466 A 5/1998

* cited by examiner

Primary Examiner—Nathan M. Nutter
(74) Attorney, Agent, or Firm—Fitch, Even, Tabin & Flannery

(57) ABSTRACT

The present invention relates to an olefin derived copolymer and a thermoplastic resin composition using the olefin derived copolymer satisfying the following (1) and (2): (1) tensile strength at break measured based on JIS K6251 is 2.0 or less MPa; and (2) tensile elongation at break EB (%) of a resin composition obtained satisfies the following relational expression (expression 1) and (expression 2), when blended with a polypropylene derived resin that has 20 degree C. xylene soluble component of not more than 20 wt %.

$R[3/5] - R[2/6] \geq 0.15$  (expression 1)

$S[2/6] \geq -800$  (expression 2)

(R[3/5] and R[2/6] are obtained by the following methods: a curve is obtained by plotting tensile elongation at break EB (%) (based on JIS K6251) of resin composition taken as vertical axis, and weight part rate Pa of a content of an olefin derived copolymer contained in a resin composition taken as horizontal axis; a multiple regression curve in section regions of Pa=0.30–0.50 and Pa=0.20–0.60 (Pa represents content weight percentage of an olefin derived copolymer contained in a resin composition) of a multiple regression expression obtained by quintic multiple regression of the curve is obtained; R[3/5] and R[2/6] are defined as multiple correlation coefficients of a primary straight line obtained by approximating of the multiple regression curve by method of least squares. S[2/6] represent a gradient of a primary straight line (expression) obtained by approximating the above-mentioned multiple regression curve by a method of least squares in section region of Pa=0.20–0.60. In addition, in the above-mentioned multiple regression expression, it is indispensable that data at least seven points Pa=0.00, 0.20, 0.30, 0.40, 0.50, 0.60 and 0.70 are contained. Furthermore, when data at points of number beyond above case are contained, it is indispensable that total Pa values exist at 0.10 or less of fixed interval mutually.

18 Claims, No Drawings

US 6,858,676 B1

OLEFIN DERIVED COPOLYMER

This application is the National phase of International Application PCT/JP00/04803, filed 17 Jul. 2000, which designated the U.S. and that International Application was not published under PCT Article 21(2) in English.

TECHNICAL FIELD

The present invention relates to an olefin derived copolymer and a thermoplastic resin composition. Furthermore in detail, the present invention relates to an olefin derived copolymer that may provide a thermoplastic resin composition with outstanding flexibility, transparency, resistance to whitening, scratch resistance, and tensile elongation characteristics, and excellent balance of flexibility, heat resistance, and weather resistance, and outstanding surface character stability and relates to a thermoplastic resin composition therewith.

BACKGROUND TECHNOLOGY

Soft vinyl chloride resin is a material that has excellent performances, such as outstanding flexibility, heat resistance, scratch resistance, and transparency, and is widely used in many fields. However, in recent years materials responsible for environmental problem comes to be required, and a demand for substitution to non-soft vinyl chloride material is increasing in use where soft vinyl chloride has been conventionally used. In such a background, as a soft material consisting only of olefin component, a resin composition comprising ethylene-α-olefin copolymer and crystalline polypropylene resin is known as thermoplastic resin compositions (JP,7-102126,A etc.) excellent in flexibility, transparency, mechanical strength, resistance to whitening, and cold resistance. However, a problem of stickiness of surface originated in ethylene-α-olefin copolymer remains as is described in JP,8-301927,A, and the material is not provided in practical use.

On the other hand, as a trial improving these stickiness, although a method of cross-linking with electron beam or peroxide in copolymer comprising ethylene-α-olefin etc. is also proposed (JP,8-301927,A, JP,9-104720,A), still sufficient result is not given. On the other hand, a tacky adhesion sheet or film comprises base material films, such as vinyl chloride resin, polyethylene, and polypropylene etc. and pressure sensitive adhesive layers with acrylics derived or rubber derived main components. These tacky adhesion sheets or films are often used as surface protection film and a tape for fixation and union at the time of packaging and packing in order to prevent crack and soils during storage or transportation of materials, such as construction materials, stainless steel, aluminum board, home electronics, precision instrument, and car, or in order to prevent getting damaged in case of secondary processings, such as bend processing and press processing. However, in recent years although a tacky adhesion film made of vinyl chloride resin group material is excellent in performances, such as flexibility, heat resistance, scratch resistance, and transparency, a conversion demand into non-chlorine derived material is increasing in material demands for environmental problem. On the other hand, although a tacky adhesion film made of polyethylene and polypropylene group material is also conventionally used in some fields as a non-chlorine derived material, a sufficient result is not given, for example in the field where advanced flexibility, such as close contact to an objects to be covered and ductility at the time of processing, is required. And although a trial in which ethylene-α-olefin copolymer with excellent flexibility is added to polyethylene or polypropylene is also carried out for the purpose of providing flexibility in response to this situation, a problem is induced that heat resistance is greatly spoiled or surface stickiness arises, if excessive amount of this ethylene-α-olefin copolymer is added in order to raise flexibility. Moreover, a material, as non-chlorine derived material using olefin derived polymer, in which styrene derived block copolymer is blended into polypropylene is inadequate in flexibility compared with vinyl chloride resin. And since styrene block unit is contained in large quantities, depending on used condition, weather resistance at the time of outdoor exposure and especially ultraviolet radiation stability are not necessarily enough to give a possible problem of decrease in physical properties in use out in the fields.

SUMMARY OF THE INVENTION

In this situation, as a result of wholehearted investigation performed by the present inventors in search of a composition that has outstanding flexibility, transparency, resistance to whitening, scratch resistance, and tensile elongation characteristics, and also has an outstanding balance of flexibility, heat resistance, and weatherproof when blended with polyolefin resin, and at the same time of a new modified material that can prevent a stickiness phenomenon, as in weathering test of car interior, after high temperature heat resistance examination, it was found out that the above-mentioned subject is solved by using a new olefin derived copolymer with certain specific physical properties. Moreover, by using a base material sheet or film containing a thermoplastic resin composition of the present invention, it was found out that the above-mentioned subject is solved to complete the present invention.

A subject solved by the present invention is to provide an olefin derived copolymer that consists only of olefin without chlorine and that gives a thermoplastic resin composition having outstanding flexibility, transparency, resistance to whitening, scratch resistance, and tensile elongation characteristics, and an excellent balance in flexibility, heat resistance, and weather resistance, and that does not generate decrease in surface character after heating promoted examination, and to provide a thermoplastic resin composition using the olefin derived copolymer.

Namely, the present invention relates to an olefin derived copolymer and a thermoplastic resin composition using the olefin derived copolymer satisfying the following (1) and (2):

(1) tensile strength at break measured based on JIS K6251 is 2.0 or less MPa; and (2) tensile elongation at break EB (%) of a resin composition obtained satisfies the following relational expression (expression 1) and (expression 2), when blended with a polypropylene derived resin that has 20 degree C. xylene solluble component of not more than 20 wt %.

$$R[3/5]-R[2/6] \geq 0.15 \quad \text{(expression 1)}$$

$$S[2/6] \geq -800 \quad \text{(expression 2)}$$

(R[3/5] and R[2/6] are obtained by the following methods:

a curve is obtained by plotting tensile elongation at break EB (%) (based on JIS K6251) of resin composition taken as vertical axis, and weight part rate Pa of a content of an olefin derived copolymer contained in a resin composition taken as horizontal axis; a multiple regression curve in section regions of Pa=0.30–0.50 and Pa=0.20–0.60 (Pa represents content weight percentage of an olefin derived copolymer contained in a resin composition) of a multiple regression expression obtained by quintic multiple regression of the curve is obtained;

R[3/5] and R[2/6] are defined as multiple correlation coefficients of a primary straight line obtained by approximating of the multiple regression curve by method of least squares. S[2/6] represents a gradient of a primary straight line (expression) obtained by approximating the above-mentioned multiple regression curve by a method of least squares insection region of Pa=0.20–0.60. In addition, in the above-mentioned multiple regression expression, it is indispensable that data at least seven points Pa=0.00, 0.20, 0.30, 0.40, 0.50, 0.60 and 0.70 are contained. Furthermore, when data at points of number beyond above case are contained, it is indispensable that total Pa values exist at 0.10 or less of fixed interval mutually.

THE BEST MODE FOR CARRYING OUT THE INVENTION

An olefin derived copolymer of the present invention means copolymers obtained by copolymerizing two or more kinds of monomer components chosen from ethylene, α-olefins with 3–20 carbons, polyene compounds, cyclic olefins, and vinyl aromatic compounds, and polymers or polymers with copolymer-like structure obtained by homopolymerizing these monomers. As examples of monomers that constitute the olefin derived copolymers, monomers of following (a)–(d) are mentioned.

(a) α-Olefins

Linear and branched α-olefins are contained as α-olefins with 3–20 carbons used in the present invention. For example, as linear α-olefins, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-hptadecene, 1-octadecene, 1-nanodecene, 1-eicocene, etc. are mentioned; as branched α-olefins, 3-methyl-1-butene, 3-methyl-1-pentene, 4-methyl-1-pentene, 2-ethyl-1-hexene, 2,2,4-trimethyl-1-pentene etc. are mentioned; and preferably linear propylene, 1-butene, 1-pentene, 1-hexene, 1-octene, 1-decene, etc. are mentioned.

(b) Polyene Compounds

As a polyene compounds suitably used in the present invention, so-called conjugated polyene compounds in which one single bond is inserted between double bonds, and the other non-conjugated polyene compounds are contained. As conjugated polyene compounds, aliphatic conjugated polyene compounds and cycloaliphatic conjugated polyene compounds etc. are mentioned. As aliphatic conjugated polyene compounds, linear aliphatic conjugated polyene compounds and branched aliphatic conjugated polyene compounds are contained. Moreover, aliphatic conjugated polyene compounds and cycloaliphatic conjugated polyene compounds may contain alkoxy group, aryl group, aryloxy group, aralkyl group, and aralkyl oxy group, etc.

As aliphatic conjugated polyene compounds, for example, 1,3-butadiene, isoprene, 2-ethyl-1,3-butadiene, 2-propyl-1,3-butadiene, 2-iso propyl-1,3-butadiene, 2-hexyl-1,3-butadiene, 2,3-dimethyl-1,3-butadiene, 2,3-diethyl-1,3-butadiene, 2-methyl-1,3-pentadiene, 2-methyl-1,3-hexadiene, 2-methyl-1,3-octadiene, 2-methyl-1,3-decadiene, 2,3-dimethyl-1,3-pentadiene, 2,3-dimethyl-1,3-hexadiene, 2,3-dimethyl-1,3-octadiene, 2,3-dimethyl-1,3-decadiene, etc. are mentioned. As cycloaliphatic conjugated polyene compounds, for example, 2-methyl-1,3-cyclopentadiene, 2-methyl-1,3-cyclohexadiene, 2,3-dimethyl-1,3-cyclopentadiene, 2,3-dimethyl-1,3-cyclohexadiene, 2-chloro-1,3-butadiene, 2,3-dichloro-1,3-butadiene, 1-fluoro-1,3-butadiene, 2-chloro-1,3-pentadiene, 2-chloro-1,3-cyclopentadiene, 2-chloro-1,3-cyclohexadiene, etc. are mentioned.

As non-conjugated polyene compounds, aliphatic non-conjugated polyene compounds, cycloaliphatic non-conjugated polyene compounds and aromatic non-conjugated polyene compounds, etc. are mentioned. As aliphatic non-conjugated polyene compounds, linear aliphatic non-conjugated polyene compounds and branched aliphatic non-conjugated polyene compounds are contained. Moreover, aliphatic non-conjugated polyene compounds, cycloaliphatic non-conjugated polyene compounds, and aromatic non-conjugated polyene compounds may contain alkoxy group, aryl group, aryloxy group, aralkyl group, aralkyl oxy group, etc. As aliphatic non-conjugated polyene compounds, for example 1,4-hexadiene, 1,5-hexadiene, 1,6-heptadiene, 1,6-octadiene, 1,7-octadiene, 1,8-nonadiene, 1,9-decadiene, 1,13-tetradecadiene, 1,5,9-decatriene, 3-methyl-1,4-hexadiene, 4-methyl-1,4-hexadiene, 5-methyl-1,4-hexadiene, 4-ethyl-1,4-hexadiene, 3-methyl-1,5-hexadiene. 3,3-dimethyl-1,4-hexadiene, 3,4-dimethyl-1,5-hexadiene, 5-methyl-1,4-heptadiene, 5-ethyl-1,4-heptadiene, 5-methyl-1,5-heptadiene, 6-methyl-1,5-heptadiene, 5-methyl-1,5-heptadiene, 3-methyl-1,6-heptadiene, 4-methyl-1,6-heptadiene, 4,4-dimethyl-1,6-heptadiene, 4-ethyl-1,6-heptadiene, 4-methyl-1,-octadiene, 5-methyl-1,4-octadiene, 4-ethyl-1,4-octadiene, 5-ethyl-1,4-octadiene, 5-methyl-1,5-octadiene, 6-methyl-1,5-octadiene, 5-ethyl-1,5-octadiene, 6-ethyl-1,5-octadiene, 6-methyl-1,6-octadiene, 7-methyl-1,6-octadiene, 6-ethyl-1,6-octadiene, 6-propyl-1,6-octadiene, 6-butyl-1,6-octadiene, 4-methyl-1,4-nonadiene, 5-methyl-1,4-nonadiene, 4-ethyl-1,4-nonadiene, 5-ethyl-1,4-nonadiene, 5-methyl-1,5-nonadiene, 6-methyl-1,5-nonadiene, 5-ethyl-1,5-nonadiene, 6-ethyl-1,5-nonadiene, 6-methyl-1,6-nonadiene, 7-methyl-1,6-nonadiene, 6-ethyl-1,6-nonadiene, 7-ethyl-1,6-nonadiene, 7-methyl-1,7-nonadiene, 8-methyl-1,7-nonadiene, 7-ethyl-1,7-nonadiene, 5-methyl-1,4-decadiene, 5-ethyl-1,4-decadiene, 5-methyl-1,5-decadiene, 6-methyl-1,5-decadiene, 5-ethyl-1,5-decadiene, 6-ethyl-1,5-decadiene, 6-methyl-1,6-decadiene, 6-ethyl-1,6-decadiene, 7-methyl-1,6-decadiene, 7-ethyl-1,6-decadiene, 7-methyl-1,7-decadiene, 8-methyl-1,7-decadiene, 7-ethyl-1,7-decadiene, 8-ethyl-1,7-decadiene, 8-methyl-1,8-decadiene, 9-methyl-1,8-decadiene, 8-ethyl-1,8-decadiene, 6-methyl-1,6-undecadiene, 9-methyl-1,8-undecadiene, 6,10-dimethyl-1,5,9-undecatriene, 5,9-dimethyl-1,4,8-decatriene, 4-ethylidene-8-methyl-1,7-nonadiene, 13-ethyl-9-methyl-1,9,12-pentadecatriene, 5,9,13-trimethyl-1,4,8,12-tetradecadiene, 8,14,16-trimethyl-1,7,14-hexadecatriene, 4-ethylidene-12-methyl-1,11-pentadecadiene, etc. may be mentioned. As cycloaliphatic non-conjugated polyene compounds, for example, vinyl cyclohexene, 5-vinyl-2-norbornene, 5-ethylidene-2-norbornene, 5-methylene-2-norbornene, 5-isopropenyl-2-norbornene, cyclo hexadiene, dicyclo pentadiene, cyclo octadiene, 2,5-norbornenadiene, 2-methyl-2,5-norbornenadiene, 2-ethyl-2,5-norbornenadiene, 2,3-diisopropylidene-5-norbornene, 2-ethylidene-3-iso propylidene-5-norbornene, 6-chloro methyl-5-isopropenyl-2-norbornene, 1,4-divinyl cyclohexane, 1,3-divinyl cyclohexane, 1,3-divinyl cyclopentane, 1,5-divinyl cyclooctane, 1-allyl-4-vinyl cyclohexane, 1,4-diallyl cyclohexane, 1-allyl-5-vinylcyclooctane, 1,5-diallylcyclooctane, 1-allyl-4-isopropenylcyclohexane, 1-isopropenyl-4-vinylcyclohexane, 1-isopropenyl-3-vinyl cyclopentane, methyl tetra hydro indene, etc. may be mentioned. As aromatic non-conjugated polyene compounds, for example, divinylbenzene, vinyl isopropenyl benzene, etc. may be mentioned.

(C) Cyclic Olefin Compounds

As cyclic olefins that may be used for constituting olefin polymers in the present invention, for example, norbornene, 5-methyl norbornene, 5-ethyl norbornene, 5-propyl norbornene, 5,6-dimethyl norbornene, 1-methyl norbornene, 7-methyl norbornene, 5,5,6-trimethyl norbornene, 5-phenyl norbornene, 5-benzyl norbornene, 5-ethylidene norbornene, 5-vinyl norbornene, 1,4,5,8-dimethano-1,2,3,4,4a,5,8,8a-octahydro naphthalene, 2-methyl-1,4,5,8-dimethano-1,2,3,4,4a,5,8,8a-octahydro naphthalene, 2-ethyl-1,4,5,8-dimethano-1,2,3,4,4a,5,8,8a-octahydro naphthalene, 2,3-dimethyl-1,4,5,8-dimethano-1,2,3,4,4a,5,8,8a-octahydro naphthalene, 2-hexyl 1,4,5,8-dimethano-1,2,3,4,4a,5,8,8a-octahydro naphthalene, 2-ethylidene-1,4,5,8-dimethano-1,2,3,4,4a,5,8,8a-octahydro naphthalene, 2-fluoro-1,4,5,8-dimethano-1,2,3,4,4a,5,8,8a-octahydro naphthalene, 1,5-dimethyl-1,4,5,8-dimethano-1,2,3,4,4a,5,8,8a-octahydro naphthalene, 2-cyclohexyl-1,4,5,8-dimethano-1,2,3,4,4a,5,8,8a-octahydro naphthalene, 2,3-dichloro-1,4,5,8-dimethano-1,2,3,4,4a,5,8,8a-octahydro naphthalene, 2-isobutyl-1,4,5,8-dimethano-1,2,3,4,4a,5,8,8a-octahydro naphthalene, 1,2-dihydro dicyclopentadiene, 5-chloro norbornene, 5,5-dichloro norbornene, 5-fluoro norbornene, 5,5,6-trifluoro-6-trifluoromethylnorbornene, 5-chloromethyl norbornene, 5-methoxy norbornene, 5,6-dicarboxyl norbornene anhydrate, 5-dimethyl amino norbornene, 5-cyano norbornene, cyclopentene, 3-methyl cyclopentene, 4-methyl cyclopentene, 3,4-dimethylcyclopentene, 3,5-dimethylcyclopentene, 3-chloro cyclopentene, cyclohexene, 3-methyl cyclohexene, 4-methyl cyclohexene, 3,4-dimethyl cyclohexene, 3-chloro cyclohexene, cycloheptene, etc. may be mentioned.

(d) Vinyl Aromatic Compounds

As a vinyl aromatic compounds which can be used for constituting olefin polymer in the present invention, for example, styrene, α-methyl styrene, p-methyl styrene, vinyl xylene, monochloro styrene, dichloro styrene, monobromo styrene, dibromo styrene, fluoro styrene, p-tert-butyl styrene, ethyl styrene, vinyl naphthalene, etc. may be mentioned.

Furthermore, in the present invention in the light of achievement of surface character stability and flexibility, and achievement of a balance of flexibility, heat resistance, and weather resistance of thermoplastic resin composition that is one of the objects of the present invention, polymers that comprise combination of specific monomers chosen from the above-mentioned monomers are preferable, and combination of following (1)–(19) may be mentioned as examples of preferable polymers;

(1) olefin derived copolymers in which ethylene and α-olefin with 3–20 carbons are indispensable, and with them one or more kinds of monomer components chosen from polyene compounds, cyclic olefins, and vinyl aromatic compounds are arbitrarily copolymerized, (2) olefin derived copolymers in which ethylene and α-olefin with 4–20 carbons are indispensable, and with them one or more kinds of monomer components chosen from polyene compounds, cyclic olefins, and vinyl aromatic compounds are arbitrarily copolymerized, (3) olefin derived copolymers in which ethylene, propylene, and α-olefins with 4–20 carbons are indispensable components, and with them one or more kinds of monomer components chosen from polyene compounds, cyclic olefins, and vinyl aromatic compounds are arbitrarily copolymerized, (4) olefin derived copolymers in which propylene and α-olefins with 4–20 carbons are indispensable components, and one or more kinds of monomer components chosen from polyene compounds, cyclic olefins, and vinyl aromatic compounds are arbitrarily copolymerized, (5) olefin derived copolymers that consist of ethylene and α-olefins with 4–20 carbons, (6) olefin derived copolymers that consist of ethylene α-olefins with 4–20 carbons and polyene compounds, (7) olefin derived copolymers that consist of ethylene, α-olefins with 4–20 carbons, and cyclic olefin compounds, (8) olefin derived copolymers that consist of ethylene, α-olefins with 4–20 carbons, and vinyl aromatic compounds, (9) olefin derived copolymers that consist of ethylene, α-olefins with 4–20 carbons, polyene compounds, and vinyl aromatic compounds,

(10) olefin derived copolymers that consist of ethylene, propylene, and α-olefins with 4–20 carbons,

(11) olefin derived copolymers that consist of ethylene, propylene, α-olefins with 4–20 carbons, and polyene compounds,

(12) olefin derived copolymers that consist of ethylene, propylene, α-olefins with 4–20 carbons, and cyclic olefin compounds,

(13) olefin derived copolymers that consist of ethylene, propylene, α-olefins with 4–20 carbons, and vinyl aromatic compounds,

(14) olefin derived copolymers that consist of ethylene, propylene, α-olefins with 4–20 carbons, polyene compounds, and vinyl aromatic compounds,

(15) olefin derived copolymers obtained by copolymerizing propylene and α-olefins with 4–20 carbons,

(16) olefin derived copolymers that consist of propylene, α-olefins with 4–20 carbons, and polyene compounds,

(17) olefin derived copolymers that consist of propylene, α-olefins with 4–20 carbons, and cyclic olefin compounds,

(18) olefin derived copolymers that consist of propylene, α-olefins with 4–20 carbons, and vinyl aromatic compounds, and

(19) olefin derived copolymers that consist of propylene, α-olefins with 4–20 carbons, polyene compounds, and vinyl aromatic compounds.

Among the above-mentioned combinations, following combinations are preferable in the light of low temperature resistance of olefin derived copolymers obtained and thermoplastic resin compositions constituted by including them.

(2) olefin derived copolymers in which ethylene and α-olefins with 4–20 carbons are indispensable, and with them one or more kinds of monomer components chosen from polyene compounds, cyclic olefins, and vinyl aromatic compounds are arbitrarily copolymerized, (3) olefin derived copolymers in which ethylene, propylene, and α-olefins with 4–20 carbons are indispensable components, and with them one or more kinds of monomer components chosen from polyene compounds, cyclic olefins, and vinyl aromatic compounds are arbitrarily copolymerized.

Among the above-mentioned combinations, following combinations are preferable in the light of a balance of flexibility, heat resistance, and weather resistance of thermoplastic resin compositions obtained and of a molded body containing the thermoplastic resin compositions obtained.

(9) olefin derived copolymers that consist of ethylene, α-olefins with 4–20 carbons,

(10) olefin derived copolymers that consist of ethylene, propylene, and α-olefins with 4–20 carbons.

Olefin derived copolymers of the present invention are olefin derived copolymers characterized by satisfying requirements of following (1) and (2):

(1) Tensile strength at break measured based on JIS K6251 is 2.0 or less MPa, and (2) tensile elongation at break EB (%) of a resin composition obtained satisfies the following expression of relations (expression 1) and (expression 2), when blended with a polypropylene derived resin that has 20 degree C. xylene solluble component not more than 20 wt %.

$$R[3/5]-R[2/6] \geq 0.15 \quad \text{(expression 1)}$$

$$S[2/6] \geq -800 \quad \text{(expression 2)}$$

(R[3/5] and R[2/6] are obtained by the following methods: a curve is obtained by plotting tensile elongation at break EB (%) (based on JIS K6251) of resin composition is taken as vertical axis, and weight part rate Pa of a content of an olefin derived copolymer contained in a resin composition is taken as horizontal axis; a multiple regression curve in section regions of Pa=0.30–0.50 and Pa=0.20–0.60 (Pa represents a content weight percentage of an olefin derived copolymer contained in a resin composition) of a multiple regression expression obtained by quintic multiple regression of the curve is obtained; R[3/5] and R[2/6] are defined as multiple correlation coefficients of a primary straight line obtained by approximating of the multiple regression curve by method of least squares. S[2/6] represents a gradient of a primary straight line (expression) obtained by approximating the above-mentioned multiple regression curve by a method of least squares in section region of Pa=0.20–0.60. In addition, in the above-mentioned multiple regression expression, it is indispensable that data at least seven points Pa=0.00, 0.20, 0.30. 0.40, 0.50, 0.60 and 0.70 are contained. Furthermore, when data at points of number beyond above case are contained, it is indispensable that total Pa values exist at 0.10 or less of fixed interval mutually.

Among the above-mentioned olefin derived copolymers, in the light of the below-mentioned viewpoint, a tensile strength at break of the olefin derived copolymers of the present invention measured based on JIS K6251 is 2.0 or less MPa, preferably 1.8 or less MPa, more preferably 1.6 or less MPa, still more preferably 1.4 or less MPa, further preferably 1.2 or less MPa, furthermore preferably 1.0 or less MPa, most preferably 0.8 or less MPa. If the value is out of this range, flexibility, transparency, resistance to whitening, and scratch resistance of the thermoplastic resin compositions obtained and the molded body containing the thermoplastic resin compositions obtained will be decreased, and a balance of flexibility, heat resistance, and weather resistance will also be impaired.

Furthermore, in the light of the same below-mentioned description in expression (1), $$R[3/5]-R[2/6] \geq 0.15,$$

preferably $R[3/5]-R[2/6] \geq 0.20,$ more preferably $R[3/5]-R[2/6] \geq 0.25,$ still more preferably $R[3/5]-R[2/6] \geq 0.30,$ further preferably $R[3/5]-R[2/6] \geq 0.35,$ most preferably $R[3/5]-R[2/6] \geq 0.40.$ Furthermore, in the light of the same below-mentioned description in expression (2), $$S[2/6] \geq -800,$$

preferably, $S[2/6] \geq 200,$ more preferably $S[2/6] \geq 100,$ still more preferably $S[2/6] \geq 50.$ When an olefin derived copolymers of the present invention do not satisfy a relationship of (expression 2), flexibility, transparency, resistance to whitening, scratch resistance, and tensile elongation characteristics of a thermoplastic resin compositions obtained and a molded body containing the thermoplastic resin compositions obtained are decreased, and aba lance of flexibility, heat resistance, and weather resistance is also decreased. Furthermore, when the olefin derived copolymer does not satisfy a relationship of (expression 1) and (expression 2), the surface character stability of the thermoplastic resin compositions obtained and of the molded body containing the thermoplastic resin compositions obtained is decreased.

In addition, a multiple regression expression, obtained by quintic multiple regression of a curve that is obtained by plotting tensile elongation at break EB (%) (based on JIS K6251) of resin compositions taken as vertical axis, and weight part rate Pa of a content of an olefin derived copolymers contained in resin compositions taken as horizontal axis, is preferably calculated using data in each composition blend point of 0.00, 0.20, 0.30, 0.40, 0.50, 0.60, and 0.70 of content weight percentage Pa of olefin derived copolymer.

Specimen is molded into No. 3 dumbbell type form, and an tensile elongation at break EB (%) obtained based on JIS K6251 of a resin composition is measured at elongation velocity of elongation velocity 200 mm/min. Moreover, the number of specimens may be three pieces, and an arithmetic mean value may be used as a measurement result. However, in order to obtain measurement results with higher accuracy, the number of specimens is preferably five or more, and more preferably seven or more, and still more preferably 9 or more, and arithmetic mean value of acquired tensile elongation at break value may be used as a result. Moreover, in order to eliminate results of cutting in irregular low elongation it is preferable that results having 80% or less of tensile elongation at break of median of measurement result, or average of two pieces which faces across center are eliminated, and an arithmetic mean value of the remaining measurement results is used as a result.

Moreover, a blending with an olefin derived copolymer and a polypropylene derived resin that has not more than 20 wt % of 20 degree C. xylene soluble component is performed by kneading each component using usual kneading equipment, for example, rubber mill, Brabender mixer, Banbury mixer, pressurized kneader, ruder, biaxial extruder, etc. Kneading temperature is a temperature at which all the mixed components are melted, and is usually set at 160–250 degrees C., and is preferably set at 180–240 degrees C. Obtained resin composition is molded under pressure into a sample with predetermined thickness by a method based on JIS K6758 and is used as a sample for tensile test.

In addition, the above-mentioned quintic multiple regression expression may be calculated using, for example, a method represented in "Statistical Method for Chemist and Chemical Engineer (second edition)" (issued by Tokyo Kagaku Dojin Co., Ltd.) 6-3 and 6-4. Moreover, a multiple correlation coefficient R and gradient S which are acquired by straight line regression using a method of least squares are calculated by method represented in "Statistical Method for Chemist and Chemical Engineer (second edition)" (issued by Tokyo Kagaku Dojin Co., Ltd.) 6-3 and 6-4.

In olefin derived copolymers of the present invention, it is still more preferable to satisfy the following (expression 3) relationship in addition to the above-mentioned relationship also from the viewpoint of a surface character stability of resin compositions.

$$S[3/5]-S[2/6] \leq 50 \quad \text{(expression 3)}$$

(S[3/5] and S[2/6] are obtained by the following methods: a curve is obtained by plotting tensile elongation at break EB (%) (based on JIS K6251) of resin composition is taken as vertical axis, and weight part rate Pa of a content of an olefin derived copolymer contained in a resin composition is taken as horizontal axis; a multiple regression curve in section regions of Pa=0.30–0.50 and Pa =0.20–0.60 (Pa represents content weight percentage of an olefin derived copolymer contained in a resin composition) of a multiple regression expression obtained by quintic multiple regression of the curve is obtained; S[3/5] and S[2/6] represents a gradient of a primary straight line (expression) obtained by approximating the above-mentioned multiple regression curve by a method of least squares.)

In this relationship, preferably $S[3/5]-S[2/6] \leq -70$, more preferably $S[3/5]-S[2/6] \leq -90$, especially preferably $S[3/5]-S[2/6] \leq -110$, most preferably $S[3/5]-S[2/6] \leq -120$.

When olefin derived copolymers of the present invention do not satisfy a relationships of (expression 2) and (expression 3), the surface character stability of the thermoplastic resin compositions obtained and of the molded body containing the thermoplastic resin compositions obtained may sometimes be decreased.

In addition, a polypropylene derived resin (X) in polypropylene derived resins with 20-degree C. xylene soluble component of not more than 20 wt %, indicated by (2) of the present invention, represents a polypropylene derived resin that is chosen from polypropylene derived resins described in full detail (i-4) in the below paragraph and that satisfies following requirements described below. In addition, 20-degree C. xylene soluble component of a polypropylene derived resin is a value according to the following method and conditions. That is, polypropylene derived resin about 200 mg is weighed, and it is mixed with xylene 10 ml, and in boiling xylene, dissolved for 50 minutes. After predetermined period, cooled for 20 minutes at room temperature, the polypropylene derived resin is crystallized in 0-degree C. iced water. Then, the solution is kept in a 20-degree C. homothermal water bath for 1 hour. Subsequently, a xylene soluble component and a xylene non-soluble component are separated by filtering, and the xylene non-soluble component is dried until it reaches constant weight in a vacuum dryer. After the xylene non-soluble component is weighed, and a weight difference from the original sample was obtained as a weight of xylene soluble component. Xylene soluble component (wt %) is obtained as a percentage of a xylene soluble component weight to an original sample weight.

Moreover, it is preferable that a crystallization temperature Tc (degree C.) and crystallization calorie ΔH (mj/mg) measured using a differential scanning calorimeter (DSC) of a polypropylene derived resin (X) with 20-degree C. xylene soluble component of not more than 20 wt % may satisfy the following relationship. (in addition in measuring DSC, a measurement is performed in both of the process of rising temperature and constant temperature at the rate of 10 degrees C./min using, for example, DSC220C (apparatus by SEIKO Electronic Ind., Co.) based on JIS K7121 and JIS K7122.)

$-10 \leq [\Delta H-(Tc \times 1.4)-62] \leq 10$, more preferably $-8 \leq [\Delta H-(Tc \times 1.4)-62] \leq 8$, still preferably $-6 \leq [\Delta H-(Tc \times 1.4)-62] \leq 6$.

If a polypropylene derived resin (X) with 20-degree C. xylene soluble component of not more than 20 wt % goes out of this range, a specific olefin derived copolymer may not be judged correctly that can provide a thermoplastic resin composition having outstanding flexibility, transparency, resistance to whitening, scratch resistance, elongation and surface stability characteristics.

Next, a polypropylene derived resin (X) with 20-degree C. xylene soluble component of not more than 20 wt % is a crystalline polypropylene that mainly has an isotactic or syndiotactic sequence structure, and preferably homogenous type and random type containing comonomer, more preferably random type polypropylene derived resin containing comonomer. In addition, in manufacturing the polypropylene derived resin, vapor phase polymerization method, bulk polymerization method, and solvent polymerization method may be adopted. And there is especially no limitation for a number average molecular weight of polymer, and is preferably adjusted to 10000–1000000.

As a method of manufacturing polypropylene derived resin (X) which has 20-degree C. xylene soluble component not more than 20 wt %, generally, following methods may be mentioned: a method wherein, homopolymerized propylene is obtained using Ziegler-Natta type catalyst in which so-called solid transition metal components containing titanium, and organic metal components are used in combination or a metallocene catalyst that comprises transition metal compounds of the 4th to 6th group in periodic table with at least one cyclopentadienyl frame and co-catalyst components by slurry polymerization, vapor phase polymerization, and bulk polymerization; and a method wherein, copolymerized propylene is obtained by copolymerising propylene and one or more kinds of olefins chosen from olefin with 2–12 carbons other than propylene. In addition, it is also possible to use commercially available corresponding materials.

Next, in the light of flexibility of blended materials with polyolefin resins it is preferable that olefin derived copolymers of the present invention satisfy the following characteristics in addition to the above-mentioned characteristics. That is, flexural modulus (Ua (MPa)) of a thermoplastic resin compositions obtained as blended materials with homogeneous polypropylene resin measured based on JIS K7203 preferably satisfies a relationship of the following expression, $$Ua \leq 1.5 \times Sa \times (Ta/100)^{3.3},$$

more preferably $Ua \leq 1.4 \times Sa \times (Ta/100)^{3.3}$, still more preferably $Ua \leq 1.3 \times Sa \times (Ta/100)^{3.3}$, especially preferably $Ua \leq 1.2 \times Sa \times (Ta/100)^{3.3}$.

If Ua goes out of the above-mentioned range, flexibility, transparency, resistance to whitening, and scratch resistance of the thermoplastic resin compositions obtained and a molded body containing the thermoplastic resin compositions obtained may be decreased. In addition, in the above-mentioned expression, Sa represents flexural modulus (MPa) of the homogeneous polypropylene resins used for blending, measured based on JIS K7203, and Ta represents added weight part (wt %) of the homogeneous polypropylene resins in the thermoplastic resin compositions.

Next, an intrinsic viscosity [η] of an olefin derived copolymer of the present invention in tetralin solvent at temperature of 135 degrees C. is preferably 0.3–10.0, more preferably 0.5–7.0, and still more preferably 0.7–5.0. If the intrinsic viscosity is too low, scratch resistance and surface character stability of a molded body containing thermoplastic resin compositions obtained and a thermoplastic resin compositions obtained may be decreased. Moreover, if the intrinsic viscosity is too high, flexibility and transparency of a molded body containing the thermoplastic resin compositions obtained and the thermoplastic resin compositions obtained may be decreased.

Measurement of intrinsic viscosity [η] is performed using an Ubbelohde viscometer in 135-degree C. tetralin. Sample 300 mg is dissolved in 100 ml tetralin, and 3 mg/ml solution was prepared. Furthermore, the solution concerned is diluted into 1/2, 1/3, and 1/5, and a viscosity of each diluted solution is measured in 135 degrees C. (±0.1 degrees C.) oil thermostat. In each concentration, measurement is repeated 3 times and an averaged value is adopted.

A molecular weight distribution (Mw/Mn) of an olefin derived copolymers of the present invention, measured by gel permeation chromatography (GPC) is preferably five or less, more preferably four or less, and still more preferably three or less. When a molecular weight distribution is too wide, flexibility of a molded body containing thermoplastic resin compositions obtained and a thermoplastic resin compositions obtained may be inferior. And moreover, that a molecular weight distribution of a polymer obtained by one-bath polymerization is large generally means a wide intermolecular composition distribution. In such a case, decrease in surface character with the passage of time of a thermoplastic resin compositions obtained and a molded body containing the thermoplastic resin compositions may be observed.

As for molecular weight distribution, measurement is performed by gel permeation chromatography (GPC) method (for example, 150 C/GPC equipment, apparatus made by Waters Co., Ltd.) Measurement conditions are as follows; elution temperature: 140 degrees C.; column used: for example, Sodex Packed Column A-80M (by Showa Denko K.K.); molecular weight standard substance: polystyrene (for example, made by TOSOH CORP., molecular weight 68–8400000). From obtained polystyrene converted weight average molecular weight (Mw) and number average molecular weight (Mn), ratio (Mw/Mn) is calculated and this is defined as a molecular weight distribution. A measuring sample of about five mg polymer is dissolved in five ml o-dichlorobenzene, and solution with a concentration of about one mg/ml is obtained. Obtained sample solution 400 micro litter is injected, detection is performed using a refractive index detecting element at elution solvent flow velocity of 1.0 ml/min.

Next, when measurement is performed based on JIS K7122 using differential scanning calorimeter (DSC), an olefin derived copolymer of the present invention preferably has neither a peak of one or more J/g based on fusion of crystal nor a peak of one or more J/g based on crystallization. When it has the peaks, flexibility, transparency, resistance to whitening, and scratch resistance of a molded body containing thermoplastic resin compositions obtained and a thermoplastic resin compositions obtained may be decreased.

Furthermore in detail, a glass transition temperature of olefin derived copolymers of the present invention (Tg) is preferably −10 degrees C. or lower, more preferably −20 degrees C. or lower, and still more preferably −25 degrees C. or lower.

As a differential scanning calorimeter, DSC220C by SEIKO Electronic Ind., Co. is used, and a measurement is performed in both of temperature rising and temperature fall process at the rate of 10 degrees C./min.

Next, although an olefin derived copolymer of the present invention may be manufactured using well-known Ziegler-Natta type catalysts or well-known single site catalysts (metallocene derived etc.), well-known single site catalysts (metallocene derived etc.) are preferable in the light of homogeneity of a composition distribution of the polymer obtained. As examples of the single site catalysts, for example, metallocene derived catalysts indicated in JP,58-19309,A, JP,60-35005,A, JP,60-35006,A, JP,60-35007,A, JP,60-35008,A, JP,61-130314,A, JP,3-163088,A, JP,4-268307,A, JP,9-12790,A, JP,9-87313,A, JP,10-508055,A, JP,11-80233,A, JP Kohyo No.10-508055, etc., and non-metallocene derived complex catalysts given in JP,10-316710,A, JP,11-100394,A, JP,11-80228,A, JP,11-80227,A, JP Kohyo No.10-513489, JP,10-338706,A, and JP Kohyo No.11-71420 may be mentioned. Also among these, generally metallocene catalysts are used and furthermore, as suitable example of metallocene catalyst, a complex is preferable that has at least one cyclopentadiene form anionic frame, and in the light of flexibility of polymers obtained a complex of transition metal of the third group to the 12th group of periodic table that has $C_1$ symmetrical structure. Furthermore, as an example of suitable manufacturing method in which metallocene catalyst is used to obtain high molecule polymer, a method of copolymerising two or more kinds of monomer components chosen from ethylene, propylene, α-olefin with 4–20 carbons, polyene compound, cyclic olefin, and vinyl aromatic compound in the presence of catalysts for olefin polymerization in which following (α), and following (β) and/or following (γ) are used may be mentioned.

(α): at least one of transition metal complexes represented by following general formulas [I]–[III],

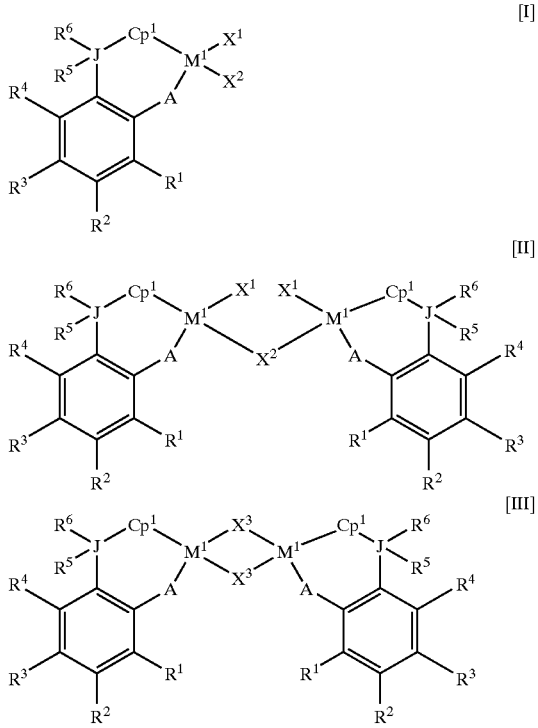

(In the above-mentioned general formula [I]–[III], $M^1$ represents a transition metal atom of a 4th group of periodic table of element, and A represents atom of a 16th group of periodic table of element, and J represents atom of a 14th group of periodic table of element, respectively. $Cp^1$ represents a group that has a cyclopentadiene form anion frame. $X^1$, $X^2$, $R^1$, $R^2$, $R^3$, $R^4$, $R^5$, and $R^6$ represent independently hydrogen atom, halogen atom, alkyl group, aralkyl group, aryl group, substituted silyl group, alkoxy group, aralkyloxy group, aryloxy group, or di-substituted amino group, respectively. $X^3$ represents atom of the 16th group of periodic table of element. $R^1$, $R^2$, $R^3$, $R^4$, $R^5$, and $R^6$ may bond together arbitrarily to form rings. Two members selected for a group of $M^1$, A and J, $Cp^1$, $X^1$, $X^2$, $X^3$, $R^1$, $R^2$, $R^3$, $R^4$, $R^5$, and $R^6$ may be the same, or they may be different from each other respectively.

(β): one or more kinds of aluminum compounds chosen from following (β1)–(β3)

(β1) organic aluminum compound represented by a general formula $E^1{}_3AlZ_{3-a}$ (β2) cyclic aluminoxane that has a structure represented by a general formula $\{-Al(E^2)-O-\}_b$ (β3) Linear aluminoxane that has a structure represented by a general formula $E^3\{-Al(E^3)-O-\}_c AlE^3{}_2$ (where, $E^1$, $E^2$, and $E^3$ is hydrocarbon group, respectively, all E, all $E^2$, and all $E^3$ may be the same, or they may be different from each other. Z represents hydrogen atom or halogen atom, and all Z may be the same, or they may be different from each other. Character a represents an integer satisfying $0 < a \leq 3$, b represents an integer of two or more, and c represents an integer of one or more.)

(γ): a boron compound selected from the following (γ1)–(γ3)

(γ1) a boron compound represented by a general formula $BQ^1Q^2Q^3$, (γ2) a boron compound represented by a general formula $G^+(BQ^1Q^2Q^3Q^4)$ (γ3) a boron compound represented by a general formula $(L-H)^+(BQ^1Q^2Q^3Q^4)$ (where, B represents a boron atom of trivalent valence state, $Q^1$ to $Q^4$ represents halogen atom, hydrocarbon group, halogenated hydrocarbon group, substituted silyl group, alkoxy group, or di-substituted amino group, and they may the same, or they maybe different from each other. $G^+$ represents inorganic or organic cation, L represents neutral Lewis base, $(L-H)^+$ represents Broensted acid.)

Hereafter, detail description will be given.

(α) Transition metal complex will be described in this paragraph. Transition metal complex (α) is represented by a general formula [I], [II], or [III]. In general formulas [I], [II], or [III], a transition metal atom shown as M↑1 represents a transition metal element of the 4th group in periodic table of element (IUPAC Inorganic Chemistry Nomenclature revised edition 1989), and, for example, titanium atom, zirconium atom, hafnium atom, etc. may be mentioned. It preferably represents titanium atom or zirconium atom.

In general formulas [I], [II], or [III], as an atom of a 16th group of periodic table that represents element represented as A, for example, oxygen atom, sulfur atom, selenium atom, etc. may be mentioned and preferably oxygen atom may be mentioned.

In general formula [I], [II], or [III], as an atom of a 14th group of periodic table that represents element represented as J, carbon atom, silicon atom, germanium atom, etc. may be mentioned, for example, and preferably carbon atom or silicon atom may be mentioned.

As a group that is represented as substituent $Cp^1$ and has cyclopentadiene form anion frame, for example, $\eta^5$-(substituted) cyclopentadienyl group, $\eta^5$-(substituted) indenyl group, $\eta^5$-(substituted) fluorenyl group, etc. may be mentioned. Specifically, for example, following groups may be mentioned; $\eta^5$-cyclopentadienyl group, $\eta^5$-methyl cyclopentadienyl group, $\eta^5$-dimethyl cyclopentadienyl group, $\eta^5$-trimethyl cyclopentadienyl group, $\eta^5$-tetramethyl cyclopentadienyl group, $\eta^5$-ethyl cyclopentadienyl group, $\eta^5$-n-propyl cyclopentadienyl group, $\eta^5$-iso propyl cyclopentadienyl group, $\eta^5$-n-butyl cyclopentadienyl group, $\eta^5$-sec-butyl cyclopentadienyl group, $\eta^5$-tert-butyl cyclopentadienyl group, $\eta^5$-n-pentyl cyclopentadienyl group. $\eta^5$-neopentyl cyclopentadienyl group, $\eta^5$-n-hexyl cyclopentadienyl group, $\eta^5$-n-octyl cyclopentadienyl group, $\eta^5$-phenyl cyclopentadienyl group, $\eta^5$-naphthyl cyclopentadienyl group, $\eta^5$-trimethyl silyl cyclopentadienyl group, $\eta^5$-triethyl silyl cyclopentadienyl group, $\eta^5$-tert-butyl dimethyl silyl cyclopentadienyl group, $\eta^5$-indenyl group, $\eta^5$-methyl indenyl group, $\eta^5$-dimethyl indenyl group, $\eta^5$-ethyl indenyl group, $\eta^5$-n-propyl indenyl group, $\eta^5$-isopropyl indenyl group, $\eta^5$-n-butyl indenyl group, $\eta^5$-sec-butyl indenyl group, $\eta^5$-tert-butyl indenyl group, $\eta^5$-n-pentyl indenyl group, $\eta^5$-neo pentyl indenyl group, $\eta^5$-n-hexyl indenyl group, $\eta^5$-octyl indenyl group, $\eta^5$-n-decyl indenyl group, $\eta^5$-phenyl indenyl group, $\eta^5$-methylphenyl indenyl group, $\eta^5$-naphthyl indenyl group, $\eta^5$-trimethyl silyl indenyl group, $\eta^5$-triethyl silyl indenyl group, $\eta^5$-tert-butyl dimethyl silyl indenyl group, $\eta^5$-tetrahydro indenyl group, $\eta^5$-fluorenyl group, $\eta^5$-methyl fluorenyl group, $\eta^5$-dimethyl fluorenyl group, $\eta^5$-ethyl fluorenyl group, $\eta^5$-diethyl fluorenyl group, $\eta^5$-n-propyl fluorenyl group, $\eta^5$-di-n-propyl fluorenyl group, $\eta^5$-iso propyl fluorenyl group, $\eta^5$-diisopropyl fluorenyl group, $\eta^5$-butyl fluorenyl group, $\eta^5$-sec-butyl fluorenyl group, $\eta^5$-tert-butyl fluorenyl group, $\eta^5$-di-n-butyl fluorenyl group, η⁵-di-sec-butyl fluorenyl group, η⁵-di-tert-butyl fluorenyl group, η⁵-n-pentyl fluorenyl group, η⁵-neo pentyl fluorenyl group, η⁵-n-hexyl fluorenyl group, η⁵-n-octyl fluorenyl group, η⁵-n-decyl fluorenyl group, η⁵-n-dodecyl fluorenyl group, η⁵-phenyl fluorenyl group, η⁵-di-phenyl fluorenyl group, η⁵-methyl phenyl fluorenyl group, η⁵-naphthyl fluorenyl group, η⁵-trimethyl silyl fluorenyl group, η⁵-bis-trimethyl silyl fluorenyl group, η⁵-triethyl silyl fluorenyl group, η⁵-tert-butyl dimethyl silyl fluorenyl group, etc. Preferably, η⁵-cyclopentadienyl group, η⁵-methyl cyclopentadienyl group, η⁵-tert-butyl cyclopentadienyl group, η⁵-tetramethyl cyclopentadienyl group, η⁵-indenyl group, or η⁵-fluorenyl group may be mentioned.

As halogen atom in substituents $X^1$, $X^2$, $R^1$, $R^2$, $R^3$, $R^4$, $R^5$, and $R^6$, fluorine atom, chlorine atom, bromine atom, iodine atom, etc. are mentioned, and preferably chlorine atom or bromine atom, more preferably chlorine atom may be mentioned.

As alkyl group in substituents $X^1$, $X^2$, $R^1$, $R^2$, $R^3$, $R^4$, $R^5$, and $R^6$, alkyl group with 1–20 carbon atoms is preferable, for example, methyl group, ethyl group, n-propyl group, isopropyl group, n-butyl group, sec-butyl group, tert-butyl group, n-pentyl group, neo pentyl group, amyl group, n-hexyl group, n-octyl group, n-decyl group, n-dodecyl group, n-pentadecyl group, n-eicosyl group, etc. are mentioned, and more preferably methyl group, ethyl group, iso propyl group, tert-butyl group, or amyl group may be mentioned.

Each of these alkyl groups may be substituted by halogen atoms, such as fluorine atom, chlorine atom, bromine atom, and iodine atom. As alkyl groups with 1–20 carbon atoms substituted by halogen atoms, for example, fluoro methyl group, difluoro methyl group, trifluoro methyl group, chloro methyl group, dichloro methyl group, trichloro methyl group, bromo methyl group, dibromo methyl group, tribromo methyl group, iodo methyl group, diiodo methyl group, trilodo methyl group, fluoro ethyl group, difluoro ethyl group, trifluoro ethyl group, tetrafluoro ethyl group, pentafluoro ethyl group, chloro ethyl group, dichloro ethyl group, trichloro ethyl group, tetrachloro ethyl group, pentachloro ethyl group, bromo ethyl group, dibromo ethyl group, tribromo ethyl group, tetra bromo ethyl group, penta bromo ethyl group, perfluoro propyl group, perfluoro butyl group, perfluoro pentyl group, perfluoro hexyl group, perfluoro octyl group, perfluoro dodecyl group, perfluoro penta decyl group, perfluoro eicosyl group, perchloro propyl group, perchloro butyl group, perchloro pentyl group, perchloro hexyl group, perchloro octyl group, perchloro dodecyl group, perchloro pentadecyl group, perchloro eicosyl group, perbromo propyl group, perbromo butyl group, perbromo pentyl group, perbromo hexyl group, perbromo octyl group, perbromo dodecyl group, perbromo pentadecyl group, perbromo eicosyl group, etc. may be mentioned.

Moreover, each of these alkyl groups may be substituted partially by alkoxy groups, such as methoxy group and ethoxy group; aryloxy groups, such as phenoxy group; or aralkyl oxy groups, such as benzyloxy group.

As aralkyl groups in substituents $X^1$, $X^2$, $R^1$, $R^2$, $R^3$, $R^4$, $R^5$, and $R^6$, aralkyl groups with 7–20 carbon atoms are preferable, for example, benzyl group, (2-methyl phenyl)methyl group, (3-methyl phenyl)methyl group, (4-methyl phenyl)methyl group, (2,3-dimethyl phenyl)methyl group, (2,4-dimethyl phenyl)methyl group, (2,5-dimethyl phenyl) methyl group, (2,6-dimethyl phenyl)methyl group, (3,4-dimethyl phenyl)methyl group, (4,6-dimethyl phenyl) methyl group, (2,3,4-trimethyl phenyl)methyl group, (2,3,5-trimethyl phenyl)methyl group, (2,3,6-trimethyl phenyl) methyl group, (3,4,5-trimethyl phenyl)methyl group, (2,4,6-trimethyl phenyl)methyl group, (2,3,4,5-tetramethyl phenyl)methyl group, methyl group (2,3,4,6-tetramethylphenyl), methyl group (2,3,5,6-tetramethyl phenyl), methyl group (penta methyl phenyl), methyl group (ethyl phenyl), methyl group (n-propyl phenyl), methyl group (iso propyl phenyl), methyl group (n-butylphenyl), (2,3,4,6-tetramethyl phenyl)methyl group, (2,3,5,6-tetramethylphenyl)methyl group, (penta methyl phenyl) methyl group, (Ethyl phenyl)methyl group, (n-propyl phenyl)methyl group, (iso-propyl phenyl)methyl group, (n-butylphenyl)methyl group, (sec-butylphenyl)methyl group, (tert-butylphenyl)methyl group, (n-pentyl phenyl) methyl group, (neo pentyl phenyl)methyl group, (n-hexyl phenyl)methyl group, (n-octyl phenyl)methyl group, (n-decyl phenyl)methyl group, (n-dodecyl phenyl)methyl group, (n-tetrapod decyl phenyl)methyl group, naphthyl methyl group, anthracenyl methyl group, etc. may be mentioned, and more preferably benzyl group is mentioned.

Each of these aralkyl groups may be substituted partially by halogen atoms, such as fluorine atom, chlorine atom, bromine atom, and iodine atom; alkoxy groups, such as methoxy group and ethoxy group; aryloxy groups, such as phenoxy group; or aralkyl oxy groups, such as benzyloxy group.

As substituents $X^1$, $X^2$, $R^1$, $R^2$, $R^3$, $R^4$, $R^5$, and $R^6$, aryl groups with 6–20 carbon atoms is preferable, for example, phenyl group, 2-trill group, 3-trill group, 4-trill group, 2,3-xylyl group, 2,4-xylyl group, 2,5-xylyl group, 2,6-xylyl group, 3,4-xylyl group, 3,5-xylyl group, 2,3,4-trimethyl phenyl group, 2,3,5-trimethyl phenyl group, 2,3,6-trimethyl phenyl group, 2,4,6-trimethyl phenyl group, 3,4,5-trimethyl phenyl group, 2,3,4,5-tetramethyl phenyl group, 2,3,4,6-tetramethyl phenyl group, 2,3,5,6-tetramethyl phenyl group, pentamethyl phenyl group, ethylphenyl group, n-propyl phenyl group, iso-propyl phenyl group, n-butylphenyl group, sec-butylphenyl group, tert-butylphenyl group, n-pentylphenyl group, neo-pentyl phenyl group, n-hexylphenyl group, n-octylphenyl group, n-decylphenyl group, n-dodecylphenyl group, n-tetradecyl phenyl group, naphthyl group, anthracenyl group, etc. may be mentioned, and more preferably phenyl group is mentioned.

Each of these aryl groups may be partially substituted by halogen atoms, such as fluorine atom, chlorine atom, bromine atom, and iodine atom; alkoxy groups, such as methoxy group and ethoxy group; aryloxy groups, such as phenoxy group; or aralkyloxy groups, such as benzyl oxy group.

Substituted silyl groups in substituentd $X^1$, $X^2$, $R^1$, $R^2$, $R^3$, $R^4$, $R^5$, and $R^6$ represents silyl groups substituted by hydrocarbon group. As hydrocarbon groups here, for example, alkyl group with 1–10 carbon atoms, such as methyl group, ethyl group, n-propyl group, iso-propyl group, n-butyl group, sec-butyl group, tert-butyl group, iso-butyl group, n-pentyl group, n-hexyl group, and cyclohexyl group; aryl groups, such as phenyl group, etc. may be mentioned. As these substituted silyl groups with 1–20 carbon atoms, for example, mono-substituted silyl group with 1–20 carbon atoms, such as methyl silyl group, ethyl silyl group, and phenyl silyl group, and di-substituted silyl group with 2–20 carbon atoms, such as dimethyl silyl group, diethyl silyl group, and diphenyl silyl group, and tri-substituted silyl group with 3–20 carbon atoms. such as trimethyl silyl group, triethyl silyl group, tri-n-propyl silyl group, tri-iso-propyl silyl group, tri-n-butyl silyl group, tri-sec-butyl silyl group, tri-tert-butyl silyl group, tri-iso-butyl silyl group, tert-butyl-dimethyl silyl group, tri-n-pentyl silyl group, tri-n-hexyl silyl group, tri-cyclohexyl silyl group, and triphenylsilyl group, etc. may be mentioned, and preferably trimethyl silyl group, tert-butyl dimethyl silyl group, or triphenylsilyl group may be mentioned.

Each hydrocarbon group of these substituting silyl groups may be partially substituted by halogen atoms, such as fluorine atom, chlorine atom, bromine atom, and iodine atom; alkoxy groups, such as methoxy group and ethoxy group; aryloxy groups, such as phenoxy group; or aralkyl oxy groups, such as benzyl oxy group.

As alkoxy groups in substituents $X^1$, $X^2$, $R^1$, $R^2$, $R^3$, $R^4$, $R^5$, and $R^6$, alkoxy groups with 1–20 carbon atoms are preferable, for example, methoxy group, ethoxy group, n-propoxy group, iso-propoxy group, n-butoxy group, sec-butoxy group, tert-butoxy group, n-pentoxy group, neopentoxy group, n-hexoxy group, n-octoxy group, n-dodecoxy group, n-pentadecoxy group, n-icosaoxy group, etc. may be mentioned, and more preferably, methoxy group, ethoxy group, or tert-butoxy group may be mentioned.

Each of these alkoxy groups may be partially substituted by halogen atoms, such as fluorine atom, chlorine atom, bromine atom, and iodine atom; alkoxy groups, such as methoxy group and ethoxy group; aryloxy groups, such as phenoxy group; or aralkyl oxy groups, such as benzyl oxy group.

As aralkyl oxy groups in substituents $X^1$, $X^2$, $R^1$, $R^2$, $R^3$, $R^4$, $R^5$, or $R^6$, aralkyl oxy groups with 7–20 carbon atoms is preferable, for example, benzyl oxy group, (2-methyl phenyl)methoxy group, (3-methyl phenyl)methoxy group, (4-methyl phenyl)methoxy group, (2,3-dimethyl phenyl)methoxy group, (2,4-dimethyl phenyl)methoxy group, (2,5-dimethyl phenyl)methoxy group, (2,6-dimethyl phenyl)methoxy group, (3,4-dimethylphenyl)methoxy group, (3,5-dimethylphenyl)methoxy group, (2,3,4-trimethyl phenyl)methoxy group, (2,3,5-trimethyl phenyl)methoxy group, (2,3,6-trimethyl phenyl)methoxy group, (2,4,5-trimethyl phenyl)methoxy group, (2,4,6-trimethyl phenyl)methoxy group, (3,4,5-trimethyl phenyl)methoxy group, (2,3,4,5-tetramethyl phenyl)methoxy group, (2,3,4,6-tetramethyl phenyl)methoxy group, (2,3,5,6-tetramethyl phenyl) methoxy group, (Penta methyl phenyl)methoxy group, (Ethyl phenyl)methoxy group, (n-propyl phenyl)methoxy group, (iso propyl phenyl)methoxy group, (n-butylphenyl) methoxy group, (sec-butylphenyl)methoxy group, (tert-butylphenyl)methoxy group, (n-hexylphenyl)methoxy group, (n-octyl phenyl)methoxy group, (n-decyl phenyl) methoxy group, (n-tetrapod decyl phenyl)methoxy group, naphthyl methoxy group, anthracenyl methoxy group, etc. may be mentioned, and more preferably benzyl oxy group may be mentioned.

Each of these aralkyl oxy groups may be partially substituted by halogen atoms, such as fluorine atom, chlorine atom, bromine atom, and iodine atom; alkoxy groups, such as methoxy group and ethoxy group; aryloxy groups, such as phenoxy group; or aralkyl oxy groups, such as benzyl oxy group.

As an aryloxy groups in substituents $X^1$, $X^2$, $R^1$, $R^2$, $R^3$, $R^4$, $R^5$, and $R^6$, aryloxy group with 6–20 carbon atoms is preferable, for example, phenoxy group, 2-methyl phenoxy group, 3-methyl phenoxy group, 4-methyl phenoxy group, 2,3-dimethyl phenoxy group, 2,4-dimethyl phenoxy group, 2,5-dimethyl phenoxy group, 2,6-dimethyl phenoxy group, 3,4-dimethyl phenoxy group, 3,5-dimethyl phenoxy group, 2,3,4-trimethyl phenoxy group, 2,3,5-trimethyl phenoxy group, 2,3,6-trimethyl phenoxy group, 2,4,5-trimethyl phenoxy group, 2,4,6-trimethyl phenoxy group, 3,4,5-trimethyl phenoxy group, 2,3,4,5-tetramethyl phenoxy group, 2,3,4, 6-tetramethyl phenoxy group, 2,3,5,6-tetramethyl phenoxy group, penta methyl phenoxy group, ethyl phenoxy group, n-propyl phenoxy group, iso-propyl phenoxy group, n-butyl phenoxy group, sec-butyl phenoxy group, tert-butyl phenoxy group, n-hexyl phenoxy group, n-octyl phenoxy group, n-decyl phenoxy group, n-tetradecyl phenoxy group, naphthoxy group, anthracenoxy group, etc. may be mentioned.

Each of these aryloxy groups may be partially substituted by halogen atoms, such as fluorine atom, chlorine atom, bromine atom, and iodine atom; alkoxy groups, such as methoxy group and ethoxy group; aryloxy groups, such as phenoxy group; or aralkyl oxy groups, such as benzyl oxy group.

Di-substituted amino groups in substituents $X^1$, $X^2$, $R^1$, $R^2$, $R^3$, $R^4$, $R^5$, and $R^6$ represents amino group substituted by two hydrocarbon groups. Here as hydrocarbon groups, for example, alkyl groups with 1–10 carbon atoms, such as methyl group, ethyl group, n-propyl group, iso-propyl group, n-butyl group, sec-butyl group, tert-butyl group, isobutyl group, n-pentyl group, n-hexyl group, and cyclo hexyl group; and aryl groups with 6–10 carbon atoms, such as phenyl group; aralkyl group with 7–10 carbon atoms, etc. may be mentioned. As di-substituted amino group substituted by hydrocarbon group with these 1–10 carbon atoms, for example, dimethyl amino group, diethyl amino group, di-n-propyl amino group, diiso-propyl amino group, di-n-butyl amino group, di-sec-butyl amino group, di-tert-butyl amino group, di-iso-butyl amino group, tert-butyl iso-propyl amino group, di-n-hexyl amino group, di-n-octyl amino group, di-n-decyl amino group, diphenyl amino group, bis-trimethyl silyl amino group, bis-tert-butyl dimethyl silyl amino group, etc. may be mentioned, and preferably dimethyl amino group or diethyl amino group may be mentioned. Each of these amino groups may be partially substituted by halogen atoms, such as fluorine atom, chlorine atom, bromine atom, and iodine atom; alkoxy groups, such as methoxy group and ethoxy group; aryloxy groups, such as phenoxy group; or aralkyl oxy groups, such as benzyl oxy group.

Substituents $X^1$, $X^2$, $R^1$, $R^2$, $R^3$, $R^4$, $R^5$, and $R^6$ may be bonded together arbitrarily to form rings.

As preferable $R^1$, alkyl group, aralkyl group, aryl group, and substituted silyl group may be mentioned. As preferable $X^1$ and $X^2$, independently halogen atom, alkyl group, aralkyl group, alkoxy group, aryloxy group, and di-substituted amino group may be mentioned, respectively, and more preferably, halogen atom and alkoxy group may be mentioned. As atoms of the 16th group of periodic table that represent element represented as $X^3$ in general formula [II] or [III], for example, oxygen atom, sulfur atom, selenium atom, etc. may be mentioned and preferably t represents oxygen atom.

As transition metal complex represented by general formula [1], for example, following complex may be mentioned; methylene(cyclopentadienyl)(3,5-dimethyl-2-phenoxy)titanium dichloride, methylene(cyclopentadienyl)(3-tert-butyl-2-phenoxy)titanium dichloride, methylene(cyclopentadienyl)(3-tert-butyl-5-methyl-2-phenoxy) titanium dichloride, methylene(cyclopentadienyl)(3-phenyl-2-phenoxy)titanium dichloride, methylene(cyclopentadienyl)(3-tert-butyl dimethyl silyl-5-methyl-2-phenoxy)titanium dichloride, methylene(cyclopentadienyl)(3-trimethyl silyl-5-methyl-2-phenoxy)titanium dichloride, methylene(cyclopentadienyl)(3-tert-butyl-5-methoxy-2-phenoxy)titanium dichloride, methylene(cyclopentadienyl)(3-tert-butyl-5-chloro-2-phenoxy)titanium dichloride, methylene(methyl cyclopentadienyl)(3,5-dimethyl-2- phenoxy)titanium dichloride, methylene(methyl cyclopentadienyl)(3-tert-butyl-2-phenoxy) titanium dichloride, methylene(methyl cyclopentadienyl)(3-tert-butyl-5-methyl-2-phenoxy)titanium dichloride, methylene (methyl cyclopentadienyl)(3-phenyl-2-phenoxy)titanium dichloride, methylene(methyl cyclopentadienyl)(3-tert-butyl dimethyl silyl-5-methyl-2-phenoxy)titanium dichloride, methylene(methyl cyclopentadienyl)(3-trimethyl silyl-5-methyl-2-phenoxy)titanium dichloride, methylene (methyl cyclopentadienyl)(3-tert-butyl-5-methoxy-2-phenoxy)titanium dichloride, methylene(methyl cyclopentadienyl)(3-tert-butyl-5-chloro-2-phenoxy) titanium dichloride, methylene(tert-butyl cyclopentadienyl) (3,5-dimethyl-2-phenoxy)titanium dichloride, methylene (tert-butyl cyclopentadienyl)(3-tert-butyl-2-phenoxy) titanium dichloride, methylene(tert-butyl cyclopentadienyl) (3-tert-butyl-5-methyl-2-phenoxy)titanium dichloride, methylene(tert-butyl cyclopentadienyl)(3-phenyl-2-phenoxy)titanium dichloride, methylene(tert-butyl cyclopentadienyl)(3-tert-butyl dimethyl silyl-5-methyl-2-phenoxy)titanium dichloride, methylene(tert-butyl cyclopentadienyl)(3-trimethyl silyl-5-methyl-2-phenoxy) titanium dichloride, methylene(tert-butyl cyclopentadienyl) (3-tert-butyl-5-methoxy-2-phenoxy)titanium dichloride, methylene(tert-butyl cyclopentadienyl)(3-tert-butyl-5-chloro-2-phenoxy)titanium dichloride, methylene (tetramethyl cyclopentadienyl)(3,5-dimethyl-2-phenoxy) titanium dichloride, methylene(tetramethyl cyclopentadienyl)(3-tert-butyl-2-phenoxy)titanium dichloride, methylene(tetramethyl cyclopentadienyl)(3-tert-butyl-5-methyl-2-phenoxy)titanium dichloride, methylene (tetramethyl cyclopentadienyl)(3-phenyl-2-phenoxy) titanium dichloride, methylene(tetramethyl cyclopentadienyl)(3-tert-butyl dimethyl silyl-5-methyl-2-phenoxy)titanium dichloride, methylene(tetramethyl cyclopentadienyl)(3-trimethyl silyl-5-methyl-2-phenoxy) titanium dichloride, methylene(tetramethyl cyclopentadienyl)(3-tert-butyl-5-methoxy-2-phenoxy) titanium dichloride, methylene(tetramethyl cyclopentadienyl)(3-tert-butyl-5-chloro-2-phenoxy) titanium dichloride, methylene(trimethyl silyl cyclopentadienyl)(3,5-dimethyl-2-phenoxy)titanium dichloride, methylene(trimethyl silyl cyclopentadienyl)(3-tert-butyl-2-phenoxy)titanium dichloride, methylene (trimethyl silyl cyclopentadienyl)(3-tert-butyl-5-methyl-2-phenoxy)titanium dichloride, methylene(trimethyl silyl cyclopentadienyl)(3-phenyl-2-phenoxy)titanium dichloride, methylene(trimethyl silyl cyclopentadienyl)(3-tert-butyl dimethyl silyl-5-methyl-2-phenoxy)titanium dichloride, methylene(trimethyl silyl cyclopentadienyl)(3-trimethyl silyl-5-methyl-2-phenoxy)titanium dichloride, methylene (trimethyl silyl cyclopentadienyl)(3-tert-butyl-5-methoxy-2-phenoxy)titanium dichloride, methylene(trimethyl silyl cyclopentadienyl)(3-tert-butyl-5-chloro-2-phenoxy) titanium dichloride; methylene(fluorenyl)(3,5-dimethyl-2-phenoxy)titanium dichloride, methylene (fluorenyl)(3-tert-butyl-2-phenoxy)titanium dichloride, methylene(fluorenyl) (3-tert-butyl-5-methyl-2-phenoxy)titanium dichloride, methylene(fluorenyl)(3-phenyl-2-phenoxy)titanium dichloride, methylene(fluorenyl)(3-tert-butyl dimethyl silyl-5-methyl-2-phenoxy)titanium dichloride, methylene (fluorenyl)(3-trimethyl silyl-5-methyl-2-phenoxy)titanium dichloride, methylene(fluorenyl)(3-tert-butyl-5-methoxy-2-phenoxy)titanium dichloride, methylene(fluorenyl)(3-tert-butyl-5-chloro-2-phenoxy)titanium dichloride, isopropylidene(cyclopentadienyl)(3,5-dimethyl-2-phenoxy) titanium dichloride, isopropylidene(cyclopentadienyl)(3-tert-butyl-2-phenoxy)titanium dichloride, isopropylidene (cyclopentadienyl)(3-tert-butyl-5-methyl-2-phenoxy) titanium dichloride, isopropylidene(cyclopentadienyl)(3-phenyl-2-phenoxy)titanium dichloride, isopropylidene (cyclopentadienyl)(3-tert-butyl dimethyl silyl-5-methyl-2-phenoxy)titanium dichloride, isopropylidene (cyclopentadienyl)(3-trimethyl silyl-5-methyl-2-phenoxy) titanium dichloride, isopropylidene(cyclopentadienyl)(3-tert-butyl-5-methoxy-2-phenoxy)titanium dichloride, isopropylidene(cyclopentadienyl)(3-tert-butyl-5-chloro-2-phenoxy)titanium dichloride, isopropylidene(methyl cyclopentadienyl)(3,5-dimethyl-2-phenoxy)titanium dichloride, isopropylidene(methyl cyclopentadienyl)(3-tert-butyl-2-phenoxy)titanium dichloride, isopropylidene (methyl cyclopentadienyl)(3-tert-butyl-5-methyl-2-phenoxy)titanium dichloride, isopropylidene(methyl cyclopentadienyl)(3-phenyl-2-phenoxy)titanium dichloride, isopropylidene(methyl cyclopentadienyl)(3-tert-butyl dimethyl silyl-5-methyl-2-phenoxy)titanium dichloride, isopropylidene(methyl cyclopentadienyl)(3-trimethyl silyl-5-methyl-2-phenoxy)titanium dichloride, isopropylidene (methyl cyclopentadienyl)(3-tert-butyl-5-methoxy-2-phenoxy)titanium dichloride, isopropylidene(methyl cyclopentadienyl)(3-tert-butyl-5-chloro-2-phenoxy) titanium dichloride, isopropylidene(tert-butyl cyclopentadienyl)(3,5-dimethyl-2-phenoxy)titanium dichloride, isopropylidene(tert-butyl cyclopentadienyl)(3-tert-butyl-2-phenoxy)titanium dichloride, isopropylidene (tert-butyl cyclopentadienyl)(3-tert-butyl-5-methyl-2-phenoxy)titanium dichloride, isopropylidene(tert-butyl cyclopentadienyl)(3-phenyl-2-phenoxy)titanium dichloride, isopropylidene(tert-butyl cyclopentadienyl)(3-tert-butyl dimethyl silyl-5-methyl-2-phenoxy)titanium dichloride, isopropylidene(tert-butyl cyclopentadienyl)(3-trimethyl silyl-5-methyl-2-phenoxy)titanium dichloride, isopropylidene(tert-butyl cyclopentadienyl)(3-tert-butyl-5-methoxy-2-phenoxy)titanium dichloride, isopropylidene (tert-butyl cyclopentadienyl)(3-tert-butyl-5-chloro-2-phenoxy)titanium dichloride, isopropylidene(tetramethyl cyclopentadienyl)(3,5-dimethyl-2-phenoxy)titanium dichloride, isopropylidene(tetramethyl cyclopentadienyl)(3-tert-butyl-2-phenoxy)titanium dichloride, isopropylidene (tetramethyl cyclopentadienyl)(3-tert-butyl-5-methyl-2-phenoxy)titanium dichloride, isopropylidene(tetramethyl cyclopentadienyl)(3-phenyl-2-phenoxy)titanium dichloride, isopropylidene(tetramethyl cyclopentadienyl)(3-tert-butyl dimethyl silyl-5-methyl-2-phenoxy)titanium dichloride, isopropylidene(tetramethyl cyclopentadienyl)(3-trimethyl silyl-5-methyl-2-phenoxy)titanium dichloride, isopropylidene(tetramethyl cyclopentadienyl)(3-tert-butyl-5-methoxy-2-phenoxy)titanium dichloride, isopropylidene (tetramethyl cyclopentadienyl)(3-tert-butyl-5-chloro-2-phenoxy)titanium dichloride, isopropylidene(trimethyl silyl cyclopentadienyl)(3,5-dimethyl-2-phenoxy)titanium dichloride, isopropylidene(trimethyl silyl cyclopentadienyl) (3-tert-butyl-2-phenoxy)titanium dichloride, isopropylidene (trimethyl silyl cyclopentadienyl)(3-tert-butyl-5-methyl-2-phenoxy)titanium dichloride, isopropylidene(trimethyl silyl cyclopentadienyl)(3-phenyl-2-phenoxy)titanium dichloride, isopropylidene(trimethyl silyl cyclopentadienyl)(3-tert-butyl dimethyl silyl-5-methyl-2-phenoxy)titanium dichloride, isopropylidene(trimethyl silyl cyclopentadienyl) (3-trimethyl silyl-5-methyl-2-phenoxy)titanium dichloride, isopropylidene(trimethyl silyl cyclopentadienyl)(3-tert-butyl-5-methoxy-2-phenoxy)titanium dichloride, isopropylidene(trimethyl silyl cyclopentadienyl)(3-tert-butyl-5-chloro-2-phenoxy)titanium dichloride, isopropylidene(fluorenyl)(3,5-dimethyl-2-phenoxy)titanium dichloride, isopropylidene(fluorenyl)(3-tert-butyl-2-phenoxy)titanium dichloride, isopropylidene(fluorenyl)(3-tert-butyl-5-methyl-2-phenoxy)titanium dichloride, isopropylidene(fluorenyl)(3-phenyl-2-phenoxy titanium dichloride, isopropylidene(fluorenyl)(3-tert-butyl dimethyl silyl-5-methyl-2-phenoxy)titanium dichloride, isopropylidene(fluorenyl)(3-trimethyl silyl-5-methyl-2-phenoxy)titanium dichloride, isopropylidene(fluorenyl)(3-tert-butyl-5-methoxy-2-phenoxy)titanium dichloride, isopropylidene(fluorenyl)(3-tert-butyl-5-chloro-2-phenoxy) titanium dichloride, diphenyl methylene(cyclopentadienyl) (3,5-dimethyl-2-phenoxy)titanium dichloride, diphenyl methylene(cyclopentadienyl)(3-tert-butyl-2-phenoxy) titanium dichloride, diphenyl methylene(cyclopentadienyl) (3-tert-butyl-5-methyl-2-phenoxy)titanium dichloride, diphenyl methylene(cyclopentadienyl)(3-phenyl-2-phenoxy)titanium dichloride, diphenyl methylene (cyclopentadienyl)(3-tert-butyl dimethyl silyl-5-methyl-2-phenoxy)titanium dichloride, diphenyl methylene (cyclopentadienyl)(3-trimethyl silyl-5-methyl-2-phenoxy) titanium dichloride, diphenyl methylene(cyclopentadienyl) (3-tert-butyl-5-methoxy-2-phenoxy)titanium dichloride, diphenyl methylene(cyclopentadienyl)(3-tert-butyl-5-chloro-2-phenoxy)titanium dichloride, diphenyl methylene (methyl cyclopentadienyl)(3,-dimethyl-2-phenoxy)titanium dichloride, diphenyl methylene(methyl cyclopentadienyl) (3-tert-butyl-2-phenoxy)titanium dichloride, diphenyl methylene(methyl cyclopentadienyl)(3-tert-butyl-5-methyl-2-phenoxy)titanium dichloride, diphenyl methylene(methyl cyclopentadienyl)(3-phenyl-2-phenoxy)titanium dichloride, diphenyl methylene(methyl cyclopentadienyl)(3-tert-butyl dimethyl silyl-5-methyl-2-phenoxy)titanium dichloride, diphenyl methylene(methyl cyclopentadienyl)(3-trimethyl silyl-5-methyl-2-phenoxy)titanium dichloride, diphenyl methylene(methyl cyclopentadienyl)(3-tert-butyl-5-methoxy-2-phenoxy)titanium dichloride, diphenyl methylene(methyl cyclopentadienyl)(3-tert-butyl-5-chloro-2-phenoxy)titanium dichloride, diphenyl methylene(tert-butyl cyclopentadienyl)(3,5-dimethyl-2-phenoxy)titanium dichloride, diphenyl methylene(tert-butyl cyclopentadienyl) (3-tert-butyl-2-phenoxy)titanium dichloride, diphenyl methylene(tert-butyl cyclopentadienyl)(3-tert-butyl-5-methyl-2-phenoxy)titanium dichloride, diphenyl methylene (tert-butyl cyclopentadienyl)(3-phenyl-2-phenoxy)titanium dichloride, diphenyl methylene(tert-butyl cyclopentadienyl (3-tert-butyl dimethyl silyl-5-methyl-2-phenoxy)titanium dichloride, diphenyl methylene(tert-butyl cyclopentadienyl) (3-trimethyl silyl-5-methyl-2-phenoxy)titanium dichloride, diphenyl methylene(tert-butyl cyclopentadienyl)(3-tert-butyl-5-methoxy-2-phenoxy)titanium dichloride, diphenyl methylene(tert-butyl cyclopentadienyl)(.3-tert-butyl-5-chloro-2-phenoxy)titanium dichloride, diphenyl methylene (tetramethyl cyclopentadienyl)(3,5-dimethyl-2-phenoxy) titanium dichloride, diphenyl methylene(tetramethyl cyclopentadienyl)(3-tert-butyl-2-phenoxy)titanium dichloride, diphenyl methylene(tetramethyl cyclopentadienyl)(3-tert-butyl-5-methyl-2-phenoxy) titanium dichloride, diphenyl methylene(tetramethyl cyclopentadienyl)(3-phenyl-2-phenoxy)titanium dichloride, diphenyl methylene(tetramethyl cyclopentadienyl)(3-tert-butyl dimethyl silyl-5-methyl-2-phenoxy)titanium dichloride, diphenyl methylene(tetramethyl cyclopentadienyl)(3-trimethyl silyl-5-methyl-2-phenoxy titanium dichloride, diphenyl methylene(tetramethyl cyclopentadienyl)(3-tert-butyl-5-methoxy-2-phenoxy) titanium dichloride, diphenyl methylene(tetramethyl cyclopentadienyl)(3-tert-butyl-5-chloro-2-phenoxy) titanium dichloride, diphenyl methylene(trimethyl silyl cyclopentadienyl)(3,5-dimethyl-2-phenoxy)titanium dichloride, diphenyl methylene(trimethyl silyl cyclopentadienyl)(3-tert-butyl-2-phenoxy)titanium dichloride, diphenyl methylene(trimethyl silyl cyclopentadienyl)(3-tert-butyl-5-methyl-2-phenoxy) titanium dichloride, diphenyl methylene(trimethyl silyl cyclopentadienyl)(3-phenyl-2-phenoxy)titanium dichloride, diphenyl methylene(trimethyl silyl cyclopentadienyl)(3-tert-butyl dimethyl silyl-5-methyl-2-phenoxy)titanium dichloride, diphenyl methylene(trimethyl silyl cyclopentadienyl)(3-trimethyl silyl-5-methyl-2-phenoxy) titanium, dichloride, diphenyl methylene(trimethyl silyl cyclopentadienyl)(3-tert-butyl-5-methoxy-2-phenoxy) titanium dichloride, diphenyl methylene(trimethyl silyl cyclopentadienyl)(3-tert-butyl-5-chloro-2-phenoxy) titanium dichloride, diphenyl methylene(fluorenyl)(3,5-dimethyl-2-phenoxy)titanium dichloride, diphenyl methylene(fluorenyl)(3-tert-butyl-2-phenoxy)titanium dichloride, diphenyl methylene(fluorenyl)(3-tert-butyl-5-methyl-2-phenoxy)titanium dichloride, diphenyl methylene (fluorenyl)(3-phenyl-2-phenoxy)titanium dichloride, diphenyl methylene(fluorenyl)(3-tert-butyl dimethyl silyl-5-methyl-2-phenoxy)titanium dichloride, diphenyl methylene (fluorenyl)(3-trimethyl silyl-5-methyl-2-phenoxy)titanium dichloride, diphenyl methylene(fluorenyl)(3-tert-butyl-5-methoxy-2-phenoxy)titanium dichloride, diphenyl methylene(fluorenyl)(3-tert-butyl-5-chloro-2-phenoxy) titanium dichloride, etc. and compounds in which titanium in these compounds is changed into zirconium or hafnium, compounds in which dichloride is changed into dibromide, diiodide, bis(dimethyl amide), bis(diethyl amide), di-n-butoxide, or diiso propoxide, compounds in which (cyclopentadienyl), is changed into (dimethyl cyclopentadienyl), (trimethyl cyclopentadienyl), (n-butyl cyclopentadienyl), (tert-butyl dimethyl silyl cyclopentadienyl), or (indenyl), transition metal complex whose J in general formula [I] represents carbon atom, such as compounds in which (3,5-dimethyl-2 phenoxy) is changed into (2 phenoxy), (3-methyl-2 phenoxy), (3,5-di-tert-butyl-2 phenoxy), (3-phenyl-5-methyl-2 phenoxy), (3-tert-butyl dimethyl silyl-2 phenoxy), or (3-trimethyl silyl-2 phenoxy), as well as dimethyl silyl(cyclopentadienyl) (2-phenoxies)titanium dichloride, dimethyl silyl (cyclopentadienyl)(3-methyl-2-phenoxy)titanium dichloride, dimethyl silyl(cyclopentadienyl)(3,5-dimethyl-2-phenoxy)titanium dichloride, dimethyl silyl (cyclopentadienyl)(3-tert-butyl-2-phenoxy)titanium dichloride, dimethyl silyl(cyclopentadienyl)(3-tert-butyl-5-methyl-2-phenoxy)titanium dichloride, dimethyl silyl (cyclopentadienyl)(3,5-di-tert-butyl-2 phenoxy)titanium dichloride, dimethyl silyl(cyclopentadienyl)(5-methyl-3-phenyl-2-phenoxy)titanium dichloride, dimethyl silyl (cyclopentadienyl)(3-tert-butyl dimethyl silyl-5-methyl-2-phenoxy)titanium dichloride, dimethyl silyl (cyclopentadienyl)(5-methyl-3-trimethyl silyl-2-phenoxy) titanium dichloride, dimethyl silyl(cyclopentadienyl)(3-tert-butyl-5-methoxy-2-phenoxy)titanium dichloride, dimethyl silyl(cyclopentadienyl)(3-tert-butyl-5-chloro-2-phenoxy) titanium dichloride), dimethyl silyl(cyclopentadienyl)(3,5-diamyl-2-phenoxy)titanium dichloride, dimethyl silyl (methyl cyclopentadienyl)(2-phenoxies)titanium dichloride, dimethyl silyl(methyl cyclopentadienyl)(3-methyl-2-phenoxy)titanium dichloride, dimethyl silyl(methyl cyclopentadienyl)(3,5-dimethyl-2-phenoxy)titanium dichloride, dimethyl silyl(methyl cyclopentadienyl)(3-tertbutyl-2-phenoxy)titanium dichloride, dimethyl silyl(methyl cyclopentadienyl)(3-tert-butyl-5-methyl-2-phenoxy) titanium dichloride, dimethyl silyl(methyl cyclopentadienyl)(3,5-di-tert-butyl-2-phenoxy)titanium dichloride, dimethyl silyl(methyl cyclopentadienyl)(5-methyl-3-phenyl-2-phenoxy)titanium dichloride, dimethyl silyl(methyl cyclopentadienyl)(3-tert-butyl dimethyl silyl-5-methyl-2-phenoxy)titanium dichloride, dimethyl silyl(methyl cyclopentadienyl)(5-methyl-3-trimethyl silyl-2-phenoxy)titanium dichloride, dimethyl silyl(methyl cyclopentadienyl)(3-tert-butyl-5-methoxy-2-phenoxy)titanium dichloride, dimethyl silyl(methyl cyclopentadienyl)(3-tert-butyl-5-chloro-2-phenoxy)titanium dichloride, dimethyl silyl (methyl cyclopentadienyl)(3,5-diamyl-2-phenoxy)titanium dichloride, dimethyl silyl(n-butyl cyclopentadienyl)(2-phenoxies)titanium dichloride, dimethyl silyl(n-butyl cyclopentadienyl)(3-methyl-2-phenoxy)titanium dichloride, dimethyl silyl(n-butyl cyclopentadienyl)(3,5-dimethyl-2-phenoxy)titanium dichloride, dimethyl silyl(n-butyl cyclopentadienyl)(3-tert-butyl-2-phenoxy)titanium dichloride, dimethyl silyl(n-butyl cyclopentadienyl)(3-tert-butyl-5-methyl-2-phenoxy)titanium dichloride, dimethyl silyl(n-butyl cyclopentadienyl)(3,5-di-tert-butyl-2-phenoxy) titanium dichloride, dimethyl silyl(n-butyl cyclopentadienyl)(5-methyl-3-phenyl-2-phenoxy)titanium dichloride, dimethyl silyl(n-butyl cyclopentadienyl)(3-tert-butyl dimethyl silyl-5-methyl-2-phenoxy)titanium dichloride, dimethyl silyl(n-butyl cyclopentadienyl)(5-methyl-3-trimethyl silyl-2-phenoxy)titanium dichloride, dimethyl silyl(n-butyl cyclopentadienyl)(3-tert-butyl-5-methoxy-2-phenoxy)titanium dichloride, dimethyl silyl(n-butyl cyclopentadienyl)(3-tert-butyl-5-chloro-2-phenoxy) titanium dichloride, dimethyl silyl(n-butyl cyclopentadienyl)(3,5-diamyl-2-phenoxy)titanium dichloride, dimethyl silyl(tert-butyl cyclopentadienyl)(2-phenoxy)titanium dichloride, dimethyl silyl(tert-butyl cyclopentadienyl)(3-methyl-2-phenoxy)titanium dichloride, dimethyl silyl(tert-butyl cyclopentadienyl)(3,5-dimethyl-2-phenoxy)titanium dichloride, dimethyl silyl(tert-butyl cyclopentadienyl)(3-tert-butyl-2-phenoxy)titanium dichloride, dimethyl silyl(tert-butyl cyclopentadienyl)(3-tert-butyl-5-methyl-2-phenoxy)titanium dichloride, dimethyl silyl(tert-butyl cyclopentadienyl)(3,5-di-tert-butyl-2-phenoxy)titanium dichloride, dimethyl silyl(tert-butyl cyclopentadienyl)(5-methyl-3-phenyl-2-phenoxy)titanium dichloride, dimethyl silyl(tert-butyl cyclopentadienyl)(3-tert-butyl dimethyl silyl-5-methyl-2-phenoxy)titanium dichloride, dimethyl silyl(tert-butyl cyclopentadienyl)(5-methyl-3-trimethyl silyl-2-phenoxy)titanium dichloride, dimethyl silyl(tert-butyl cyclopentadienyl)(3-tert-42-butyl-5-methoxy-2-phenoxy)titanium dichloride, dimethyl silyl (tert-butyl cyclopentadienyl)(3-tert-butyl-5-chloro-2-phenoxy)titanium dichloride, dimethyl silyl(tert-butyl cyclopentadienyl)(3,5-diamyl-2-phenoxy)-titanium dichloride, dimethyl silyl(tetramethyl, cyclopentadienyl)(2-phenoxy)titanium dichloride, dimethyl silyl(tetramethyl cyclopentadienyl)(3-methyl-2-phenoxy)-titanium dichloride, dimethyl silyl(tetramethyl cyclopentadienyl)(3,5-dimethyl-2-phenoxy)titanium dichloride, dimethyl silyl (tetramethyl cyclopentadienyl)(3-tert-butyl-2-phenoxy) titanium dichloride, dimethyl silyl(tetramethyl cyclopentadienyl)(3-tert-butyl-5-methyl-2-phenoxy) titanium dichloride, dimethyl silyl(tetramethyl cyclopentadienyl)(3,5-di-tert-butyl-2-phenoxy)titanium dichloride, dimethyl silyl(tetramethyl cyclopentadienyl)(5-methyl-3-phenyl-2-phenoxy)titanium dichloride, dimethyl silyl(tetramethyl cyclopentadienyl)(3-tert-butyl dimethyl silyl-5-methyl-2-phenoxy)titanium dichloride, dimethyl silyl (tetramethyl cyclopentadienyl)(5-methyl-3-trimethyl silyl-2-phenoxy)titanium dichloride, dimethyl silyl (tetramethyl cyclopentadienyl)(3-tert-butyl-5-methoxy-2-phenoxy)titanium dichloride, dimethyl silyl(tetramethyl cyclopentadienyl)(3-tert-butyl-5-chloro-2-phenoxy) titanium dichloride, dimethyl silyl(tetramethyl cyclopentadienyl)(3,5-diamyl-2-phenoxy)titanium dichloride, dimethyl silyl(trimethyl silyl cyclopentadienyl)(2 phenoxy)titanium dichloride, dimethyl silyl(trimethyl silyl cyclopentadienyl)(3-methyl-2-phenoxy) titanium dichloride, dimethyl silyl(trimethyl silyl cyclopentadienyl)(3,5-dimethyl-2-phenoxy)titanium dichloride, dimethyl silyl(trimethyl silyl cyclopentadienyl) (3-tert-butyl-2-phenoxy)titanium dichloride, dimethyl silyl (trimethyl silyl cyclopentadienyl)(3-tert-butyl-5-methyl-2-phenoxy)titanium dichloride, dimethyl silyl(trimethyl silyl cyclopentadienyl)(3,5-di-tert-butyl-2-phenoxy)titanium dichloride, dimethyl silyl(trimethyl silyl cyclopentadienyl) (5-methyl-3-phenyl-2-phenoxy)titanium dichloride), dimethyl silyl(trimethyl silyl cyclopentadienyl)(3-tert-butyl dimethyl silyl-5-methyl-2-phenoxy)titanium dichloride, dimethyl silyl(trimethyl silyl cyclopentadienyl)(5-methyl-3-trimethyl silyl-2-phenoxy)titanium dichloride, dimethyl silyl(trimethyl silyl cyclopentadienyl)(3-tert-butyl-5-methoxy-2-phenoxy)titanium dichloride, dimethyl silyl (trimethyl silyl cyclopentadienyl)(3-tert-butyl-5-chloro-2-phenoxy)titanium dichloride, dimethyl silyl(trimethyl silyl cyclopentadienyl)(3,5-diamyl-2-phenoxy)titanium dichloride, dimethyl silyl(indenyl)(2-phenoxy)titanium dichloride, dimethyl silyl(indenyl)(3-methyl-2-phenoxy) titanium dichloride, dimethyl silyl(indenyl)(3,5-dimethyl-2-phenoxy)titanium dichloride, dimethyl silyl(indenyl)(3-tert-butyl-2-phenoxy)titanium dichloride, dimethyl silyl (indenyl)(3-tert-butyl-5-methyl-2-phenoxy)titanium dichloride, dimethyl silyl(indenyl)(3,5-di-tert-butyl-2-phenoxy)titanium dichloride, dimethyl silyl(indenyl)(5-methyl-3-phenyl-2-phenoxy)titanium dichloride, dimethyl silyl(indenyl)(3-tert-butyl dimethyl silyl-5-methyl-2-phenoxy)titanium dichloride, dimethyl silyl(indenyl)(5-methyl-3-trimethyl silyl-2-phenoxy)titanium dichloride, dimethyl silyl(indenyl)(3-tert-butyl-5-methoxy-2-phenoxy) titanium dichloride, dimethyl silyl(indenyl)(3-tert-butyl-5-chloro-2-phenoxy)titanium dichloride, dimethyl silyl (indenyl)(3,5-diamyl-2-phenoxy)titanium dichloride, dimethyl silyl(fluorenyl)(2-phenoxy)titanium dichloride, dimethyl silyl(fluorenyl)(3-methyl-2-phenoxy)titanium dichloride, dimethyl silyl(fluorenyl)(3,5-dimethyl-2-phenoxy)titanium dichloride, dimethyl silyl(fluorenyl)(3-tert-butyl-2-phenoxy)titanium dichloride, dimethyl silyl (fluorenyl)(3-tert-butyl-5-methyl-2-phenoxy)titanium dichloride, dimethyl silyl(fluorenyl)(3,5-di-tert-butyl-2-phenoxy)titanium dichloride, dimethyl silyl(fluorenyl)(5-methyl-3-phenyl-2-phenoxy)titanium dichloride, dimethyl silyl(fluorenyl)(3-tert-butyl dimethyl silyl-5-methyl-2-phenoxy)titanium dichloride, dimethyl silyl(fluorenyl)(5-methyl-3-trimethyl silyl-2-phenoxy)titanium dichloride, dimethyl silyl(fluorenyl)(3-tert-butyl-5-methoxy-2-phenoxy)titanium dichloride, dimethyl silyl(fluorenyl)(3-tert-butyl-5-chloro-2-phenoxy)titanium dichloride, dimethyl silyl(fluorenyl)(3,5-diamyl-2-phenoxy)titanium dichloride, dimethyl silyl(tetramethyl cyclopentadienyl)(1-naphthoxy-2-yl)titanium dichloride etc., and transition metal complexes whose J in general formula [1] represents atom of the 14th group of periodic table of elements other than carbon atom, such as, compounds in which in these compounds (cyclopentadienyl) is changed into (dimethyl cyclopentadienyl), (trimethyl cyclopentadienyl), (ethyl cyclopentadienyl), (n-propyl cyclopentadienyl), (isopropyl cyclopentadienyl), (sec-butyl cyclopentadienyl), (isobutyl cyclopentadienyl), (tert-butyl dimethyl silyl cyclopentadienyl), (phenyl cyclopentadienyl), (methyl indenyl), or (phenyl indenyl), in which (2-phenoxy) is changed into (3-phenyl-2-phenoxy), (3-trimethyl silyl-2-phenoxy), or (3-tert-butyl dimethyl silyl-2-phenoxy), in which dimethyl silyl is changed into diethyl silyl, diphenyl silyl, or dimethoxy silyl, in which titanium is changed into zirconium or hafnium, compounds in which dichloride is changed into dibromide, diiodide, bis(dimethyl amide), bis (diethyl amide), di-n-butoxide, or di-isopropoxide may be mentioned.

As transition metal complexes represented by general formula [II], for example, $\mu$-oxo-bis{isopropylidene (cyclopentadienyl)(2-phenoxy)titanium chloride}, $\mu$-oxo-bis{isopropylidene(cyclopentadienyl)(2-phenoxy)titanium methoxide}, $\mu$-oxo-bis{isopropylidene(cyclopentadienyl) (3-tert-butyl-5-methyl-2-phenoxy)titanium chloride}, $\mu$-oxo-bis{isopropylidene(cyclopentadienyl)(3-tert-butyl-5-methyl-2-phenoxy)titanium methoxide}, $\mu$-oxo-bis{isopropylidene(methyl cyclopentadienyl)(2-phenoxy) titanium chloride}, $\mu$-oxo-bis{isopropylidene(methyl cyclopentadienyl)(2-phenoxy)titanium methoxide}, $\mu$-oxo-bis{isopropylidene(methyl cyclopentadienyl)(3-tert-butyl-5-methyl-2-phenoxy)titanium chloride}, $\mu$-oxo-bis{isopropylidene(methyl cyclopentadienyl)(3-tert-butyl-5-methyl-2-phenoxy)titanium methoxide}, $\mu$-oxo-bis{isopropylidene(tetramethyl cyclopentadienyl)(2 phenoxies)titanium chloride}, $\mu$-oxo-bis{isopropylidene (tetramethyl cyclopentadienyl)(2-phenoxy)titanium methoxide}, $\mu$-oxo-bis{isopropylidene(tetramethyl cyclopentadienyl)(3-tert-butyl-5-methyl-2-phenoxy) titanium chloride}, $\mu$-oxo-bis{isopropylidene(tetramethyl cyclopentadienyl)(3-tert-butyl-5-methyl-2-phenoxy) titanium methoxide}, $\mu$-oxo-bis{dimethyl silylene (cyclopentadienyl)(2-phenoxy)titanium chloride}, $\mu$-oxo-bis{dimethyl silylene(cyclopentadienyl)(2-phenoxy) titanium methoxide}, $\mu$-oxo-bis{dimethyl silylene (cyclopentadienyl)(3-tert-butyl-5-methyl-2-phenoxy) titanium chloride}, $\mu$-oxo-bis{dimethyl silylene (cyclopentadienyl)(3-tert-butyl-5-methyl-2-phenoxy) titanium methoxide}, $\mu$-oxo-bis{dimethyl silylene(methyl cyclopentadienyl)(2-phenoxy)titanium chloride}, $\mu$-oxo-bis{dimethyl silylene(methyl cyclopentadienyl)(2-phenoxy) titanium methoxide}, $\mu$-oxo-bis{dimethyl silylene(methyl cyclopentadienyl)(3-tert-butyl-5-methyl-2-phenoxy) titanium chloride}, $\mu$-oxo-bis{dimethyl silylene(methyl cyclopentadienyl)(3-tert-butyl-5-methyl-2-phenoxy) titanium methoxide}, $\mu$-oxo-bis{dimethyl silylene (tetramethyl cyclopentadienyl)(2-phenoxy)titanium chloride}, $\mu$-oxo-bis{dimethyl silylene(tetramethyl cyclopentadienyl)(2-phenoxy)titanium methoxide}, $\mu$-oxo-bis{dimethyl silylene(tetramethyl cyclopentadienyl)(3-tert-butyl-5-methyl-2-phenoxy)titanium chloride}, $\mu$-oxo-bis{dimethyl silylene(tetramethyl cyclopentadienyl)(3-tert-butyl-5-methyl-2-phenoxy)titanium methoxide) etc. may be mentioned.

As transition metal complex represented by general formula [III], for example, di-$\mu$-oxo-bis{isopropylidene (cyclopentadienyl)(2-phenoxy)titanium}, di-$\mu$-oxo-bis{isopropylidene(cyclopentadienyl)(3-tert-butyl-5-methyl-2-phenoxy)titanium}, di-$\mu$-oxo-bis{isopropylidene (methyl cyclopentadienyl)(2-phenoxy)titanium}, di-$\mu$-oxo-bis{isopropylidene(methyl cyclopentadienyl)(3-tert-butyl-5-methyl-2-phenoxy)titanium}, di-oxo-bis{isopropylidene (tetramethyl cyclopentadienyl)(2-phenoxy titanium}, di-mu-oxo-bis{isopropylidene(tetramethyl cyclopentadienyl)(3-tert-butyl-5-methyl-2-phenoxy) titanium}, di-mu-oxo-bis{dimethyl silylene (cyclopentadienyl)(2-phenoxy)titanium}, di-$\mu$-oxo-bis{dimethyl silylene(cyclopentadienyl)(3-tert-butyl-5-methyl-2-phenoxy)titanium}, di-$\mu$-oxo-bis{dimethyl silylene(methyl cyclopentadienyl)(2-phenoxy)titanium}, di-$\mu$-oxo-bis{dimethyl silylene(methyl cyclopentadienyl)(3-tert-butyl-5-methyl-2-phenoxy)titanium}, di-$\mu$-oxo-bis{dimethyl silylene(tetramethyl cyclopentadienyl)(2-phenoxy)titanium}, di-$\mu$-oxo-bis{dimethyl silylene (tetramethyl cyclopentadienyl)(3-tert-butyl-5-methyl-2-phenoxy)titanium} etc. may be mentioned.

Transition metal complexes represented by the above-mentioned general formula [I], for example, may be manufactured by a method described in WO097/03992 laid open specification. Moreover, transition metal complex represented by the above-mentioned general formula [II] or [III] may be manufactured by reacting transition metal complex represented by the above-mentioned general formula [I] with one chemical equivalent or two chemical equivalents of water.

($\beta$) Description about aluminum compounds will be given in this paragraph.

As aluminum compounds ($\beta$), one or more kinds of aluminum compounds chosen from following ($\beta$1)–($\beta$3) are mentioned.

($\beta$1) Organic aluminum compounds represented by a general formula $E^1{}_3aAlZ_{3-a}$ ($\beta$2) Cyclic aluminoxanes that has a structure represented by a general formula $\{—Al(E^2)—O—\}_b$ ($\beta$3) Linear aluminoxanes that has a structure represented by a general formula $E^3\{—Al(E^3)—O—\}_cAlE^3{}_2$ (where $E^1$, $E^2$, and $E^3$ represent hydrocarbon groups, respectively, and all $E^1$, all $E^2$, and all $E^3$ may be the same, or they may be different from each other. Z represents hydrogen atom or halogen atom, and all Z may be the same, or may be different from each other. Character are presents a number that satisfies $0<a \leqq 3$, b an integer of two or more, and c an integer of one or more.)

As hydrocarbon groups in $E^1$, $E^2$, or $E^3$, hydrocarbon groups with 1–8 carbons are preferable, and alkyl groups are more preferable.

As examples of organic aluminum compounds ($\beta$1) represented by a general formula $E^1{}_aAlZ_{3-a}$; trialkyl aluminums, such as trimethyl aluminum, triethyl aluminum, tripropyl aluminum, triisobutyl aluminum, and trihexyl aluminum; dialkyl aluminum chlorides, such as dimethyl aluminum chloride, diethyl aluminum chloride, dipropyl aluminum chloride, diisobutyl aluminum chloride, and dihexyl aluminum chloride; alkyl aluminum dichlorides, such as methyl aluminum dichloride, ethyl aluminum dichloride, propyl aluminum dichloride, isobutyl aluminum dichloride, and hexyl aluminum dichloride; dialkyl aluminum hydrides, such as dimethyl aluminum hydride, diethyl aluminum hydride, dipropyl aluminum hydride, diisobutyl aluminum hydride, and dihexyl aluminum hydride, etc. may be mentioned. Preferably, trialkyl aluminum may be mentioned and more preferably triethyl aluminum or triisobutyl aluminum.

As examples of $E^2$ and $E^3$ in a cyclic aluminoxane ($\beta$2) that has a structure represented by a general formula $\{—Al(E^2)—O—\}_b$, and linear an aluminoxanes ($\beta$3) that have a structure represented by a general formula $E^3\{—Al(E^3)—O—\}_cAlE^3{}_2$, alkyl groups, such as methyl group, ethyl group, normal propyl group, isopropyl group, normal butyl group, isobutyl group, normal pentyl group, and neopentyl group may be mentioned. Character b represents an integer of two or more, and c represents an integer of one or more. Preferably, $E^2$ and $E^3$ represent methyl group or isobutyl group, and b represents 2–40 and c represents 1–40.

The above-mentioned aluminoxanes may be made by various kinds of methods. Methods of manufacturing the aluminoxanes do not have any limitation, and they may be manufactured according to well-known methods. For example, an alminoxane is obtained by contacting a solution in which a trialkyl aluminum (for example, trimethyl aluminum etc.) is dissolved in suitable organic solvents (benzene, aliphatic hydrocarbon, etc.) with water. Moreover, a method of contacting a trialkyl aluminum (for example, trimethyl aluminum etc.) with metal salts (for example, copper sulfate hydrate etc.) containing water of crystallization may be mentioned.

($\gamma$) Description about boron compounds will be given in this paragraph.

As boron compounds ($\gamma$), any one selected from ($\gamma$1) boron compounds represented by a general formula $BQ^1Q^2Q^3$, and ($\gamma$2) boron compounds represented by a general formula $G^+(BQ^1Q^2Q^3Q^4)^-$, and ($\gamma$3) boron compounds represented by a general formula $(L-H)^+(BQ^1Q^2Q^3Q^4)^-$ may be used.

In boron compounds ($\beta$1) represented by a general formula $BQ^1Q^2Q^3$, B represents boron atom of trivalent valence state, $Q^1$ to $Q^3$ represent halogen atom, hydrocarbon group, halogenated hydrocarbon group, substituted silyl group, alkoxy group, or di-substituted amino group, and they may be the same, or different from each other. As $Q^1$ to $Q^3$ halogen atom, hydrocarbon group containing 1–20 carbon atoms, halogenated hydrocarbon group containing 1–20 carbon atoms, substituted silyl group containing 1–20 carbon atoms, alkoxy group containing 1–20 carbon atoms, or amino group containing 2–20 carbon atoms may be preferably mentioned, and more preferably $Q^1$ to $Q^3$ represent halogen atom, hydrocarbon group containing 1–20 carbon atoms, or halogenated hydrocarbon containing 1–20 carbon atoms. Still more preferably, $Q^1$ to $Q^4$ represent fluorinated hydrocarbon group with 1–20 carbon atoms containing at least one fluorine atom, respectively, and furthermore preferably $Q^1$ to $Q^4$ represent fluorinated aryl group with 6–20 carbon atoms containing at least one fluorine atom, respectively.

As an example of compounds ($\gamma$1), tris(pentafluoro phenyl)boran, tris(2,3,5,6-tetrafluoro phenyl)boran, tris(2,3,4,5-tetrafluoro phenyl)boran, tris(3,4,5-trifluoro phenyl)boran, tris(2,3,4-trifluoro phenyl)boran, phenyl bis(penta fluoro phenyl boran, etc. may be mentioned, and most preferably tris(pentafluoro phenyl)boran may be mentioned.

In boron compounds ($\gamma$2) represented by a general formula $G^+(BQ^1Q^2Q^3Q^4)$, $G^+$ represents a, inorganic or organic cation, and B represents boron atom of trivalent valence state, and $Q^1$ to $Q^4$ are the same as $Q^1$ to $Q^3$ in above ($\gamma$1).

As example of $G^+$ that represents an inorganic cation in compounds represented by a general formula $G^+(BQ^1Q^2Q^3Q^4)^-$, ferrocenium cation, alkyl substituted ferrocenium cation, silver cation, etc. may be mentioned, and triphenylmethyl cation etc. may be mentioned as $G^+$ that represents organic cation. As $G^+$, carbenium cation may be preferably mentioned, and especially preferably triphenylmethyl cation. As $(BQ^1Q^2Q^3Q^4)^-$, tetrakis(penta fluoro phenyl borate, tetrakis(2,3,5,6-tetrafluoro phenyl)borate, tetrakis(2,3,4,5-tetrafluoro phenyl)borate, tetrakis(3,4,5-trifluoro phenyl)borate, tetrakis(2,3,4-trifluoro phenyl) borate, phenyltris(penta fluoro phenyl)borate, tetrakis(3,5-bistrifluoro methyl phenyl)borate, etc. may be mentioned.

As practical examples of these compounds, ferrocenium tetrakis(pentafluorophenyl)borate, 1,1-dimethylferrocenium tetrakis(pentafluoro phenyl)borate, silver tetrakis (pentafluoro phenyl)borate, triphenylmethyl tetrakis(penta fluoro phenyl)borate, triphenylmethyl tetrakis (3,5-bistrifluoro methyl phenyl)borate, etc. may be mentioned, and most preferably triphenylmethyl tetrakis(pentafluoro phenyl)borate may be mentioned.

Moreover, in boron compounds ($\gamma$3) represented by a general formula $(L-H)^+(BQ^1Q^2Q^3Q^4)^-$, L represents neutral Lewis bases, $(L-H)^+$ represents Broensted acids, B represents boron atom of trivalent valence state, and $Q^1$ to $Q^4$ are the same as $Q^1$ to $Q^3$ in the above-mentioned Lewis acid ($\gamma$1).

As an example of $(L-H)^+$ that represents Broensted acid in compound represented with general formula $(L-H)^+ (BQ^1Q^2Q^3Q^4)^-$, trialkyl substituted ammonium, N, and N-dialkyl anilinium, dialkyl ammonium, triaryl phosphonium, etc. are mentioned, and as $(BQ^1Q^2Q^3Q^4)^-$, the same example as the above-mentioned description may be mentioned.

As practical examples of these compounds, triethyl ammonium tetrakis(pentafluoro phenyl)borate, tripropyl ammonium tetrakis(pentafluoro phenyl)borate, tri(n-butyl) ammonium tetrakis(pentafluoro phenyl)borate, tri(n-butyl) ammonium tetrakis(3,5-bistrifluoromethyl phenyl)borate, N,N-dimethylanilinium tetrakis(pentafluoro phenyl)borate, N,N-diethyl anilinium tetrakis(pentafluoro phenyl)borate, N,N-2,4,6-pentamethyl anilinium tetrakis(pentafluoro phenyl)borate, N,N-dimethyl anilinium tetrakis(3,5-bistrifluoromethyl phenyl)borate, diisopropyl ammonium tetrakis(pentafluoro phenyl)borate, dicyclohexylammonium tetrakis(pentafluoro phenyl)borate, triphenyl phosphonium tetrakis(pentafluoro phenyl)borate, tri(methyl phenyl) phosphonium tetrakis(pentafluoro phenyl)borate, tri (dimethyl phenyl)phosphonium tetrakis(pentafluoro phenyl) borate, etc. may be mentioned, and most preferably tri(n-butyl)ammonium tetrakis(pentafluoro phenyl)borate or N,N-dimethyl anilinium tetrakis(pentafluoro phenyl)borate may be mentioned.

In copolymerization, a transition metal complex ($\alpha$), and a catalyst for olefin polymerization in which the above-mentioned ($\beta$) and/or the above-mentioned ($\gamma$) are used. When a catalyst for olefin polymerization that consists of two component of ($\alpha$) and ($\beta$) is used, as ($\beta$), the above-mentioned cyclic aluminoxane ($\beta$2) and/or the above-mentioned linear aluminoxane ($\beta$3) are preferable. Moreover, as another preferable embodiment of a catalyst for olefin polymerization, the above-mentioned catalyst for olefin polymerization in which the above-mentioned ($\alpha$), ($\beta$), and ($\gamma$) are used may be mentioned, and as the ($\beta$), the above-mentioned ($\beta$) is easily used in the case.

Usually, each component is preferably used in an amount of mole ratio in a range that ($\beta$)/($\alpha$) is 0.1–10000, preferably 5–2000, and mole ratio in a range that ($\gamma$)/($\alpha$) is 0.01–100, preferably 0.5–10.

Concentration is suitably chosen based on conditions, such as performance of equipment that supplies each component to a polymerization reactor, in the case where each component is used in a solution state or in a state of suspension in solvent. Generally each component is used so that ($\alpha$) is usually in a range of 0.01–500 $\mu$mol/g, more preferably 0.05–100 $\mu$mol/g, and still preferably, 0.05–50 $\mu$mol/g. And generally each component is used so that ($\beta$) is usually in a range of 0.01–10000 $\mu$mol/g, as Al atom converted value, more preferably 0.1–5000 μmol/g, and still preferably 0.1–2000 μmol/g. Moreover, each component is used so that (γ) is usually in a range of 0.01–500 μmol/g, more preferably 0.05–200 μmol/g, and still preferably, 0.05–100 μmol/g.

In order to manufacture olefin derived copolymers, a solvent polymerization method or a slurry polymerization method in which aliphatic hydrocarbons, such as butane, pentane, hexane, heptane, and octane, aromatic hydrocarbons, such as benzene and toluene, or halogenated hydrocarbons, such as methylene dichloride, are used as a solvent, and a vapor phase polymerization method in gas-phase monomer, etc. may be used. Moreover, either continuous polymerization method or batch cycle polymerization method may be used. A polymerization temperature may be adopted the range of −50 to 200 degrees C., and a range of −20 to 100 degrees C. is especially preferable. As for polymerization pressure, atmospheric pressure to 60 kg/cm$^2$G is preferable. Generally polymerization time may be decided suitably based on a kind of catalyst used, and reaction equipments, and the range of one minute–20 hours may be adopted. Moreover, in order to adjust a molecular weight of polymer, a chain-transferring agent, such as hydrogen, may also be added.

Subsequently, thermoplastic resin compositions in the present invention obtained from new olefin derived copolymers and thermoplastic resins will be described.

Thermoplastic resin compositions of the present invention are thermoplastic resin compositions that consist of 1–99 weight % of (i) thermoplastic resins, and 99–1 weight % of (ii) olefin derived copolymers of the present invention.

Preferably, thermoplastic resin compositions of the present invention are thermoplastic resin compositions that consist of 5–95 weight % of (i) thermoplastic resins and, 95–5 weight % of (ii) olefin derived copolymers of the present invention, more preferably thermoplastic resin compositions that consist of 10–90 weight % of (i) thermoplastic resins, and 90–10 weight % of (ii) olefin derived copolymers of the present invention, still more preferably thermoplastic resin compositions that consist of 15–85 weight % of (i) thermoplastic resins and, and 85–15% of (ii) olefin derived copolymers of the present invention, and especially preferably thermoplastic resin compositions that consist of 20–80 weight % of (i) thermoplastic resins and, 80–20 weight % of (ii) olefin derived copolymers of the present invention.

Components (i) used for thermoplastic resin compositions of the present invention are thermoplastic resins. (i) may be widely selected from various well-known thermoplastic resins, for example, polyethylene derived resins, such as high-density polyethylene and middle-density polyethylene, low-density polyethylene,-and linear low-density polyethylene (LLDPE); polypropylene derived resins; polybutene derived resins: poly-4-methyl-pentene-1 derived resins; polystyrene derived resins; polyester derived resins; polyamide derived resins; poly phenyleneether derived resins; polyphenylene oxide-resins; polyacetal derived resins; polycarbonate derived resins, etc. may be mentioned. Preferably, (i) are (i-1) polyolefin derived resins, more preferably polyolefin derived resins that have (i-2) aliphatic olefins with two or more carbons, as main components, more preferably, (i-3) poly olefin derived resins that have aliphatic olefins with three or more carbons as main components, and especially preferably (i-4) polypropylene derived resins.

As (i-4) polypropylene derived resins, crystalline polypropylenes that mainly have isotactic or syndiotactic sequence structure. Polypropylenes of such as homogeneous type, random type containing comonomer, or block type by multi-stage polymerization that have structures in a wide range may be used. In addition, as a polymerization method of the polypropylene derived resins, a vapor phase polymerization method, a bulk polymerization method, a solvent polymerization method, and a multi-stage polymerization in which the above-mentioned methods are combined arbitrarily are employable. Moreover, there is especially no limitation in a number average molecular weight of polymer, and it is preferably adjusted to 10000–1000000.

As indexes of crystalline state of (i-4) polypropylene derived resins, for example, a melting point, an amount of crystal melting calorie, etc. are used. A melting point is preferably in a range of 80 degrees C.–176 degrees C., and, an amount of crystal melting calorie is preferably is in a range of 30 J/g–120 J/g. More preferably, a melting point is in a range of 120 degrees C.–176 degrees C., and an amount of crystal melting calorie in a range of 60 J/g–120 J/g. If a melting point is too low or an amount of heat of fusion is too small, heat resistance of thermoplastic resin compositions and a molded body containing thermoplastic resin compositions obtained may be decreased.

Following methods are used as methods of manufacturing (i-4) polypropylene derived resins. Generally as catalysts, so-called Ziegler-Natta type catalysts in which transition metal components in a shape of a solid containing titanium and organic metal components are combined, or metallocene catalysts that consist of transition metal compounds of the 4th group—the 6th group of periodic table with at least one cyclopentadienyl frame and co-catalyst components are used. As polymerization methods, slurry polymerization, vapor phase polymerization, bulk polymerization, solution polymerization, etc. are used, or methods in which the above-mentioned methods are combined are used in one-step or multi-step to obtain homopolymerized polypropylenes. Moreover, copolymerized polypropylenes may be obtained by copolymerizing propylene with one or more olefins selected from olefins having 2–12 carbons other than propylene in one-step or multi-step using the above-mentioned methods. In addition, it is also possible to use commercially available materials.

In thermoplastic resin compositions and a molded body containing thermoplastic resin compositions of the present invention, when flexibility, transparency, resistance to whitening, scratch resistance, and excellent performance balance are required, it is preferable that (i) are polypropylene derived resins (i-6) in which 15 or more to 205 or less of methylene carbons in two or more chains are contained in 1000 carbon chains as main chain. More preferably, 25 or more to 155 or less of methylene carbons in two or more chains are contained in 1000 carbon chains as main chain, and still more preferably 35 or more to 105 or less. If (i-6) goes out of the range, flexibility, transparency, resistance to whitening, and scratch resistance of thermoplastic resin compositions and a molded body containing thermoplastic resin compositions obtained may be decreased. As methods of having a predetermined number of methylene carbons of two or more chains contained into (i-6), a method of copolymerizing ethylene to propylene, and a method of forming tail-to-tail bonds of propylene may be mentioned. Content of methylene carbons of two or more chains contained in 1000 carbon chains of (i-6) as main chain can be measured using $^{13}$C-NMR, IR, etc. The analysis method of $^{13}$C-NMR and IR is indicated in New Edition Macromolecule Analysis Handbook 1.2.3 (1995).

When performance excellent in shock resistance and resistance to whitening is required for a molded body containing thermoplastic resin compositions and thermoplastic resin compositions of the present invention, it is preferable that (i) are polypropylene derived resin compositions (i-7) obtained by having ethylene and propylene copolymerized in two or more steps. In detail, (i-7) represents the following compositions: in a first step, a photopolymer of propylene, or ethylene propylene copolymer having 5.0 or less weight % of ethylene content is obtained, and in a second step or after, ethylene propylene copolymer having 7–85 weight % of ethylene content is obtained, and at the same time, a weight ratio of a polymer obtained in a first step to a polymer obtained in a second step or after is 30/70–90/10. (A propylene homopolymer or ethylene propylene copolymer obtained in a polymerization of a first step may be denoted as "copolymer-1" hereinafter. And ethylene propylene copolymer obtained in a copolymerization in a second step or after may be denoted as "copolymer-2".)

Ethylene content of the copolymer-1 is preferably 5.0 or less weight %. If ethylene content exceeds 5.0 weight %, heat resistance of thermoplastic resin compositions and a molded body containing thermoplastic resin compositions obtained using the polypropylene derived resin compositions may be decreased.

Eethylene content of the copolymer-2 is preferably 7–85 weight %. The resistance to whitening of thermoplastic resin compositions obtained using the polypropylene derived resin compositions may be decreased when ethylene content is too small. Alternatively when ethylene content is excessive, shock resistance of thermoplastic resin compositions and a molded body containing thermoplastic resin compositions obtained using the polypropylene derived resin compositions may be decreased.

A weight ratio of the copolymer-1 and the copolymer-2 is 30/70–90/10. When a content of the copolymer-1 is too little (the copolymer-2 is excessive), thermoplastic resin compositions and, and a molded body containing thermoplastic resin compositions obtained using the polypropylene derived resin compositions cannot obtain sufficient resistance to whitening. On the other hand, when the copolymer-1 is excessive (content of the copolymer-2 is too little), inadequate shock resistance may be obtained in the thermoplastic resin compositions and the molded body containing thermoplastic resin compositions that are obtained using the polypropylene derived resin compositions.

In addition small quantity, for example, about one to five weight %, of α-olefins other than propylene and ethylene (for example, butene-1, hexene-1, octene-1, etc.) may be contained in the copolymer-1 and copolymer-2.

Common name of the above-mentioned polypropylene derived resins is sometimes "block polypropylene" or "high impact polypropylene", and commercially available materials may be used.

When performance excellent in transparency, elongation, flexibility, and workability is required for thermoplastic resin compositions, and a molded body containing thermoplastic resin compositions of the present invention, it is preferable that (i) is propylene-ethylene copolymers (i-8) that have JIS A hardness of 70–97 measured based on JIS K6301, and have modulus of elasticity in bending measured based on JIS K7203 of 50–500 MPa.

JIS A hardness of (i-8) measured based on JIS K6301 is preferably 70–97, more preferably 75–97. When the hardness is too small, heat resistance of thermoplastic resin compositions obtained and a molded body containing thermoplastic resin compositions may be decreased. On the other hand, when the hardness is excessive, flexibility of thermoplastic resin compositions obtained and a molded body containing thermoplastic resin compositions may be decreased.

Modulus of elasticity in bending of (i-8) measured based on JIS K7203 is preferably 50–500 MPa, and more preferably is 55–450 MPa. When the modulus of elasticity in bending is too small, heat resistance of thermoplastic resin composition and a molded body containing thermoplastic resin compositions obtained may be decreased, and when the modulus of elasticity in bending is excessive, on the other hand, flexibility of thermoplastic resin compositions and a molded body containing thermoplastic resin compositions obtained may be decreased.

As each monomer component that constitutes copolymer (i-8), components that have 1–85 mol % of monomer unit based on ethylene, and 99–15 mol % of monomer unit based on propylene are preferable. The monomer may contain α-olefins other than ethylene, propylene, for example, 1-butene, 4-methyl-1-pentene, 1-hexene, 3-methyl-1-butene; or non-conjugated diene monomers, such as 1,4-hexadiene, dicyclopentadiene, 5-ethylidene-2-norbornene, 7-methyl-1,6-octadiene in a range of 5 mol % or less.

Moreover, (i-8) may be copolymers obtained by copolymerizing monomers other than the above-mentioned monomers that have functional groups. As the functional groups, hydroxyl group, carboxyl group, acid anhydride group, amino group, isocyanate group, epoxy group, ester group, etc. may be mentioned. As such monomers, for example, (meth)acrylic acid hydroxy acrylate, (anhydrous)maleic acid, glycidyl (meth)acrylate, etc. may be mentioned. Moreover, propylene-ethylene copolymers are modified and the above-mentioned functional groups may be introduced.

As (i-8), random type or block type copolymers by multi-stage polymerization maybe mentioned. As polymerization methods, vapor phase polymerization method, bulk polymerization method, solvent polymerization method, and multi-stage polymerization method in which the above-mentioned polymerization methods are arbitrarily combined may be employable. Moreover, there is especially no limitation for a number average molecular weight of the polymer, and it is preferably adjusted to 10000–1000000.

In addition, corresponding commercial materials may be used as propylene-ethylene copolymers (i-8).

In the case where thermoplastic resin compositions and a molded body containing thermoplastic resin composition of the present invention is required excellent performance in elongation, flexibility, transparency, and workability, in addition to (i-8) and (ii), poly olefin derived resins (i-9) that have flexural modulus measured based on JIS K7203 of 550–1800 MPa may be further contained.

Flexural modulus of (i-9) measured based on JIS K7203 is 550–1800 MPa, and preferably is 600–1800 MPa. When the modulus of elasticity in bending is too small, heat resistance of thermoplastic resin compositions and a molded body containing thermoplastic resin compositions obtained may be decreased, and when the modulus of elasticity in bending is excessive, on the other hand, flexibility of thermoplastic resin compositions and a molded body containing thermoplastic resin compositions obtained maybe decreased. In case of using (i-9), an amount preferably satisfies that an weight ratio of (amount of sum of (i) and (i-8))/(amount of (i-9) is 30/70–99/1. A good balance of flexibility and strength of thermoplastic resin compositions and a molded body containing thermoplastic resin compositions obtained may be achieved using (i-9) in this range.

When performance excellent in transparency and flexibility is required for thermoplastic resin compositions and a molded body containing thermoplastic resin compositions of the present invention, it is preferable that (i) is (i-10) poly butene derived resins. (i-10) is polybutene homopolymer resins or polybutene copolymer resins synthesized by well-known technology using Ziegler-Natta type catalysts or metallocene derived catalysts. It is preferable that a melting point of (i-10) measured by a differential scanning calorimeter (DSC) is 30–130 degrees C., more preferably 40–130 degrees C., and especially preferably 50–130 degrees C. When the melting point is too low, heat resistance and strength of thermoplastic resin compositions and a molded body containing thermoplastic resin compositions obtained using this polybutene may be decreased. As a differential scanning calorimeter, DSC220C by SEIKO Electronic Ind., Co. is used, for example, and measurement is performed at the rate of 10 degrees C./min in both of temperature rising and temperature fall process.

(i-10) is obtained by copolymerizing 1-butene with ethylene or α-olefins with 3–8 carbons. Propylene, 1-hexene, 1-octene, etc. are mentioned as preferable α-olefins. A percentage of the α-olefins, an amount of 50 or less weight % is used, preferably 5–40 weight %, and especially preferably one–30 weight %. In addition, commercially available materials may be used as (i-10).

When performance excellent in transparency and flexibility is required for thermoplastic resin compositions and a molded body containing thermoplastic resin compositions of the present invention and strength and heat resistance is further required, in addition to polybutene derived resins (i-10) and (ii), polypropylene derived resins (i-4) may further be contained, and it is preferable that 1–98 weight % of (i-10), 1–98 weight % of (ii), and 1–98 weight % of (i-4) may be contained. Furthermore, it is more preferable that 5–90 weight % of (i-10), and 5–90 weight % of (ii), and 5–90 weight % of (i-4) maybe contained. When (ii) is too little, flexibility and transparency of thermoplastic resin compositions and a molded body containing thermoplastic resin compositions obtained may be decreased. On the other hand, when (ii) is excessive, heat resistance and strength of thermoplastic resin compositions and a molded body containing thermoplastic resin compositions obtained may be decreased. When (i-10) is too little, flexibility and transparency of thermoplastic resin compositions and a molded body containing thermoplastic resin compositions obtained may be decreased. On the other hand, when (i-10) is excessive, strength and heat resistance of thermoplastic resin compositions and a molded body containing thermoplastic resin compositions obtained may be decreased. When (i-4) is too little, heat resistance and strength of thermoplastic resin compositions and a molded body containing thermoplastic resin compositions obtained may be decreased. When polypropylene derived resin (i-4) is excessive, on the other hand, flexibility and transparency of thermoplastic resin compositions and a molded body containing thermoplastic resin compositions obtained may be decreased.

When performance excellent in transparency and heat resistance is required for thermoplastic resin compositions and a molded body containing thermoplastic resin compositions of the present invention, cyclic olefin derived resins (i-5) may be used as (i).

(i-5) is cyclic olefin homopolymer resins or cyclic olefin copolymer resins synthesized by well-known technology using Ziegler-Natta type catalysts or metallocene derived catalysts. As cyclic olefins, for example, norbornene, 5-methyl norbornene, 5-ethyl norbornene, 5-propyl norbornene, 5,6-dimethyl norbornene, 1-methyl norbornene, 7-methyl norbornene, 5,5,6-trimethyl norbornene, 5-phenyl norbornene, 5-benzyl norbornene, 5-ethylidene norbornene, 5-vinyl norbornene, 1,4,5,8-dimethano-1,2,3,4,4a,5,8,8a-octahydro naphthalene, 2-methyl-1,4,5 8-dimethano-1,2,3, 4,4a,5,8,8a-octahydro naphthalene, 2-ethyl-1,4,5,8-dimethano-1,2,3,4,4a,5,8,8a-octahydro naphthalene, 2,3-dimethyl-1,4,5,8-dimethano-1,2,3,4,4a,5,8,8a-octahydro naphthalene, 2-hexyl-1,4,5,8-dimethano-1,2,3,4,4a,5,8,8a-octahydro naphthalene, 2-ethylidene-1,4,5,8-dimethano 1,2, 3,4,4a,5,8,8a-octahydro naphthalene, 2-fluoro-1,4,5,8-dimethano-1,2,3,4,4a,5,8 8a-octahydro naphthalene, 1,5-dimethyl-1,4,5,8-dimethano-1,2,3,4,4a,5,8,8a-octahydro naphthalene, 2-cyclohexyl-1,4,5,8-dimethano-1,2,3,4,4a,5, 8,8a-octahydro naphthalene, 2,3-dichloro-1,4,5,8-dimethano-1,2,3,4,4a,5,8,8a-octahydro naphthalene, 2-isobutyl-1,4,5,8-dimethano-1,2,3,4,4a,5,8,8a-octahydro naphthalene, 1,2-dihydro dicyclopentadiene, 5-chloro norbornene, 5,5-dichloro norbornene, 5-fluoro norbornene, 5,5,6-trifluoro-6-trifluoro methyl norbornene, 5-chloro methyl norbornene, 5-methoxy norbornene, 5,6-dicarboxyl norbornene anhydrate, 5-dimethylamino norbornene, 5-cyanonorbornene, cyclopentene, 3-methylcyclopentene. 4-methylcyclopentene, 3,4-dimethylcyclopentene, 3,5-dimethylcyclopentene, 3-chlorocyclopentene, cyclohexene, 3-methyl cyclohexene, 4-methyl cyclohexene, 3,4-dimethyl cyclohexene, 3-chloro cyclohexene, cyclo heptene, etc. may be mentioned.

(i-5) is obtained by copolymerizing cyclic olefins with ethylene or α-olefins with 3–8 carbons, and as preferable α-olefins, propylene, 1-butene, 1-hexene, 1-octene, etc. may be mentioned. As for percentage of these alpha-olefins, an amount of 50 or less weight % is used, preferably 0.5–40 weight %, and especially preferably 1–30 weight %.

Thermoplastic resin compositions of the present invention consists of 1–99 weight % of (i), and 99–1 weight % of (ii), (where (i)+(ii)=100 weight %), preferably, 5–90 weight % of (i), and 95–10 weight % of (ii), more preferably, 10–80 weight % of (i), and 90–20 weight % of (ii), still more preferably, 15–70 weight % of (i) and 85–30 weight % of (ii), and especially preferably, 20–60 weight % of (i) and 80–40 weight % of (ii). When (i) is too small ((ii) is excessive), flexibility may be decreased. On the other hand, when (ii) is excessive ((i) is too little), strength may be decreased.

In thermoplastic resin compositions of the present invention, it is preferable that haze measured based on JIS K7105 of 1 mm thick press molded sheet is 75% or less, preferably, 70% or less, more preferably, 65% or less, still preferably, 60% or less, and especially preferably, 55% or less. When haze goes out of this range, flexibility, transparency, resistance to whitening, and scratch resistance of thermoplastic resin compositions and a molded body containing thermoplastic resin compositions may be decreased. In addition, this 1 mm thick press molded sheet must be a press molded sheet molded according to a forming method of test piece indicated by JIS examination method of thermoplastic resins contained in thermoplastic resin compositions. For example, if a thermoplastic resin contained in thermoplastic resin composition is polypropylene derived resin, press molded sheet molded by JIS K6758 according to the method of publication must be used. Attention must be paid to appearance, such as mixing of air bubbles and foreign matters, to the molded sheet, and a portion in which they exist must not be used for evaluation.

In thermoplastic resin compositions of the present invention, it is preferable that haze measured based on JIS K7105 after 50 degree C. and 100-hour heat run test of 1 mm thick press molded sheet is 90% or less. A temperature of heat run test is preferably 70 degrees C., more preferably 80 degrees C., still more preferably 90 degrees C., and especially preferably 110 degrees C. When the haze goes out of this range, a surface character stability of thermoplastic resin compositions and a molded body containing thermoplastic resin compositions may be decreased. In addition, as a 1 mm thick press molded sheet, a sheet obtained by the above-mentioned press molding method must be used.

In thermoplastic resin compositions of the present invention, it is preferable that a haze value difference (Δ haze) measured based on JIS K7105 before and after 50 degree C. and 100 hour heat run test of 1 mm thick molded sheet is 40 or less, more preferably 35 or less, still more preferably 30 or less, further more preferably 25 or less, and most preferably 20 or less. Moreover, a temperature of the heat run test is preferably 70 degrees C., more preferably 80 degrees C., still more preferably 90 degrees C., and especially preferably 110 degrees C. When out of this range, a surface character stability of thermoplastic resin compositions and a molded body containing thermoplastic resin compositions may get inferior. In addition, as a 1 mm thick press molded sheet, a sheet obtained by the above-mentioned press molding method must be used. Moreover, the heat run test of 50 degree C. and 100 hours for 1 mm thick molded sheet must be carried out based on air heating aging test (6.3) of JIS K6301 "6. Aging test", except that examination temperature is set at 50 degrees C., and examination time for 100 hours. By hanging and heating the test pieces in testing machine tub, at this time, the test pieces hung must not contact mutually, and they must not touch any portion of wall in the testing machine tub.

In thermoplastic resin compositions of the present invention, it is preferable that modulus of elasticity in bending (Ub (MPa)) measured based on JIS K7203 satisfies a relationship of the following expression.

$Ub \leq 1.5 \times Sb \times (Tb/100)^{3.3}$, more preferably $Ub \leq 1.4 \times Sb \times (Tb/100)^{3.3}$ still more preferably, $Ub \leq 1.3 \times Sb \times (Tb/100)^{3.3}$, and especially preferably $Ub \leq 1.2 \times Sb \times (Tb/100)^{3.3}$.

When Ub goes out of the above-mentioned range, flexibility, transparency, resistance to whitening, and scratch resistance of thermoplastic resin compositions and a molded body containing thermoplastic resin compositions may be decreased. In addition, in the above-mentioned expression, Sb represents flexural modulus (MPa) measured based on JIS K7203of (a), and Tb represents an added weight part (%) of (a) in thermoplastic resin compositions.

Furthermore, thermoplastic resin compositions of the present invention is specialized in a gloss value change before and after examination of 1 or less, when a molded sheet with 2 or less of surface gloss, and with embossed pattern obtained using the composition by molding according to the below-mentioned conditions undergoes a heat run test of 110 degree C. and 100 hours. When the gloss change value becomes equal to or more than the range, decline in surface quality (stickiness etc.) of thermoplastic resin compositions and a molded body containing thermoplastic resin compositions may be induced. In addition, heat run test of 110 degree C. and 100 hours of molded sheet with embossed pattern having two or less surface gloss is carried out by the following method. Press molded sheet of 1 mm thick (15 cm square) with Glen C granulated leather embossed pattern is prepared using press molding machine so that the surface gloss value with granulated leather embossed pattern measured by the following method may be two or less. In addition, a press molding is performed using the same type of molding machine under the conditions of pressurized cooling method (50 kg/cm$^2$G, upper and lower plate with water cooling), after raw material is heated and melted for 5 minutes under conditions of upper and lower plate at 200 degrees C., 5 kg/cm$^2$ G. This sheet is cut into a rectanglar by 5 cm×3 cm, and subsequently is laid so that the surface with granulated leather embossed pattern may be upper surface in Gear oven aging tester (PHH type) made by Tabai Corporation at temperature of tub set as 110 degrees C., and it is kept to stand for 100 hours. Surface gloss value of the surface with granulated leather embossed pattern of the press molded sheet before and after examination is measured using a digital bending glossmeter (UGV-5DP type) made by Suga Test Instruments Co., Ltd. under a condition in which incident angle-acceptance angle is set at 60 degrees, respectively. In addition, all gloss measurement is performed after sample is cooled to room temperature.

In addition to (i) thermoplastic resins and (ii) olefin derived copolymers of the present invention both of which are indispensable component, thermoplastic resin compositions of the present inventions may also contain one or more kinds of components selected from following (iii)–(v) in a range that does not impair an object of the present invention.

(iii): block copolymers consisting of polymer blocks mainly containing vinyl aromatic compounds, and polymer blocks mainly containing conjugated diene compounds, (iv): hydrogenated (iii), (v): ethylene derived polymers with a tensile strength at break equal to or more than 2.1MPa measured based on JIS K6251.

(iii) maybe block copolymers consisting of polymer blocks mainly containing vinyl aromatic compounds, and polymer blocks mainly containing conjugated diene compounds. Polymer blocks mainly containing vinyl aromatic compound are polymer blocks that contain conjugated diene compounds etc. as other constituent components. As vinyl aromatic compounds, styrene, α-methyl styrene, p-methyl styrene, vinyl xylene, monochloro styrene, dichloro styrene, monobromo styrene, dibromo styrene, fluoro styrene, p-tert-butyl styrene, ethyl styrene, vinyl naphthalene, etc. may be mentioned. These are independently used, or two or more of them are used in combination. Among these especially preferable compound is styrene. A content of vinyl aromatic compound in the polymer block is preferably 60–99 weight %. When the content is too little, a mechanical strength of thermoplastic resin compositions and a molded body containing thermoplastic resin compositions may be decreased. On the other hand, when the content is excessive, flexibility of thermoplastic resin compositions and a molded body containing thermoplastic resin compositions may be decreased.

The polymer blocks mainly containing conjugated diene compounds are polymer blocks that contain conjugated diene compounds as main constituent components, and vinyl aromatic compounds etc. as other constituent components. As conjugated diene compounds, 1,3-butadiene, isoprene, 2,3-dimethyl-1,3-butadiene, 2-neopentyl-1,3-butadiene, and 2-chloro-1,3-butadiene, 2-cyano-1,3-butadiene, substituted linear conjugated penta dienes, linear chain and side chain conjugated hexadienes, etc. may be mentioned. These are used independently, or two or more of them are used in combination. Among these especially preferable compounds are 1,3-butadiene, and isoprene. A content of conjugated diene compounds in the polymer blocks is preferably 60–99 weight %. When the content is too little, flexibility of thermoplastic resin compositions and a molded body containing thermoplastic resin compositions may be decreased.

On the other hand, when the content is excessive, mechanical strength of thermoplastic resin compositions and a molded body containing thermoplastic resin compositions may be decreased.

Specifically, (iii) is represented by a general formula: (cH-cS)n, (cH-cS)n-cH, and (cH-cS)n-X (where, in the formula, cH represents a polymer block mainly containing vinyl aromatic compounds, cS represents polymer block mainly containing conjugated diene compounds, and X represents a coupling group residue, and n represents an integer of one or more.)

A content ratio of ((polymer block mainly containing vinyl aromatic compounds)/(polymer block mainly containing conjugated diene compounds)) in block copolymers that consist of polymer blocks mainly containing vinyl aromatic compounds, and of polymer blocks mainly containing conjugated diene compounds is preferably 2/98–50/50. When the ratio is too small, elasticity of thermoplastic resin compositions and a molded body containing thermoplastic resin compositions may be decreased, and high elasticity may not be obtained, and on the other hand, when the ratio is too large, flexibility of thermoplastic resin compositions and a molded body containing thermoplastic resin compositions may be decreased.

In order to obtain (iii), generally in organic solvent, block cH or block cS is first polymerized using polymerization initiators, such as organic lithium compounds, and subsequently, block cS or block cH may be polymerized. Whichever of block cH or block cS may be polymerized first. Moreover, a block copolymer (cH-cS)n (n represents an integer of one or more) may be obtained by repeating the polymerization operations. And, block copolymer cH-cS-cH may be obtained using polymerization initiators, such as organic lithium compound, by polymerizing block cH, and subsequently block cS, and further block cH in organic solvent. When these operations is repeated, a block copolymer (cH-cS)n-cS (n is an integer of one or more) may also be obtained. Thus, a block copolymer (cH-cS)n-X (X is coupling agent residue and n is an integer of one or more) may also be obtained by adding a coupling agent to a thus obtained block copolymer (cH-cS)n. As coupling agents, diethyl adipate, divinylbenzene, tetrachloro silane, butyl trichlorosilane, tetrachloro tin, butyl trichloro tin, dimethyl dichloro silane, tetrachloro germanium, 1,2-dibromo ethane, 1,4-chloro methyl benzene, bis(trichloro silyl)ethane, epoxidized linseed oil, tolylene diisocyanate, 1,2,4-benzene tri isocyanate, etc. may be mentioned. In addition, corresponding commercial materials may also be used as block copolymers mentioned in (iii) that contains polymer block mainly containing vinyl aromatic compounds, and polymer block mainly containing conjugated diene compounds.

(iv) is hydrogenated compounds of the above (iii). For example, the above (iii) is dissolved into an inactive solvent, and hydrogenation is performed to obtain (iv) under existence of a hydrogenation catalyst at 20–150 degrees C. and under hydrogen pressure of 1–100 kg/cm$^2$G. Rate of hydrogenation of conjugated diene compound in the above-mentioned (iii) may be adjusted by changing conditions at the time of hydrogenation reaction, such as a hydrogenation catalyst, an amount added of a hydrogenation compound, or a hydrogen pressure and a reaction time. In addition, corresponding commercial materials may also be used as hydrogenated compounds of the above (iii) of (iv).

When a property excellent in flexibility and mechanical strength is required of thermoplastic resin compositions and a molded body containing thermoplastic resin compositions of the present invention, the thermoplastic resin compositions and a molded body containing the thermoplastic resin compositions preferably satisfy conditions below.

(i) is contained of 1–98 weight %, (ii) is contained of 1–98 weight %, and (iii) and/or (iv) are contained 1–98 weight %, and more preferably (i) is contained of 5–90 weight %, (ii) is contained of 5–90 weight %, and (iii) and/or (iv) are contained 5–90 weight %.

(v) is ethylene derived polymers whose tensile strength at break measured based on JIS K6251 is 2.1 or more MPa. As examples of (v), low-density polyethylene, linear low-density polyethylene, super-low-density polyethylene, medium-density polyethylene, high-density polyethylene, and copolymer containing ethylene, that is, copolymers or multiple copolymers of ethylene with one or two comonomers or more selected form the following group may be mentioned. The group is shown below: alpha-olefins, such as ethylene, propylene, 1-butene, 4-methyl-1-pentene, 1-hexene, 1-heptene, and 1-octene; non-conjugated dienes, such as 1,4-hexadiene, dicyclopentadiene, and 5-ethylidene-2-norbornene; monocarboxylic acids, such as acrylic acid, methacrylic acid, ethyl acrylic acid, and crotonic acid; dicarboxylic acid and mono esters thereof, such as maleic acid, fumaric acid, itaconic acid, and citraconic acid; acrylic acid or methacrylic acid ester, such as methylmethacrylate, methyl acrylate, and ethyl acrylate; vinyl esters and their ionomers of saturated carboxylic acids, such as vinyl acetate and vinyl propionate. These polymers or copolymers may be mixtures of two or more. Furthermore, (v) is ethylene derived polymers with ethylene content of equal to 80 mol % or more preferably.

When a property excellent in resistance to low temperature is required of thermoplastic resin compositions and a molded body containing thermoplastic resin compositions of the present invention, the thermoplastic resin compositions and a molded body containing the thermoplastic resin compositions preferably satisfy following conditions; (i) is contained of 1–98 weight %, (ii) is contained of 1–98 weight %, and (v) is contained of 1–98 weight %, and more preferably (i) is contained of 5–90 weight %, (ii) is contained of 5–90 weight %, and (v) is contained of 5–90 weight %.

When a property excellent in flexibility, mechanical strength, and resistance to low temperature is required of thermoplastic resin compositions and a molded body containing thermoplastic resin compositions of the present invention, the thermoplastic resin compositions and a molded body containing thermoplastic resin compositions preferably satisfy following conditions; (i) is contained of 1–97 weight %, (ii) is contained of 1–97 weight %, (iii) and/or (iv) is contained of 1–97 weight %, and (v) is contained of 1–97 weight %, and more preferably (i) is contained of 5–85 weight %, (ii) is contained of 5–85 weight %, (iii) and/or (iv) is contained of 5–85 weight %, and (v) is contained of 5–85 weight %.

Rubber components other than (ii) may be blended suitably if needed to thermoplastic resin compositions and a molded body containing thermoplastic resin compositions of the present invention in addition to indispensable components (i) and (ii), for example, natural rubbers, poly butadienes, liquefied poly butadienes, polyacrylonitrile rubbers, acrylonitrile-butadiene copolymer rubbers, partially hydrogenated acrylonitrile-butadiene copolymer rubbers, isobutylene-isoprene rubbers, polychloroprene rubbers, fluororubbers, chloro sulfonated polyethylenes, silicone rubbers, polyurethane rubbers, isobutylene-isoprene copolymer rubbers, halogenated isobutylene-isoprene copolymer rubbers, etc.

If needed, thermoplastic resin compositions and a molded body containing thermoplastic resin compositions of the present invention may be given cross-linkings by conventionally well-known methods such as, sulfur cross-linking, peroxide cross-linking, metal ion cross-linking, silane cross-linking, resin cross-linking, etc. As cross-linking agents, cross-linking agents generally used in curing of rubbers may be used, and cross-linking agents of sulfur, phenol resin, metal oxide, metal hydroxide, metal chloride, p-quinonedioxime, or bismaleimide derived agents etc. may be mentioned. Although cross-linking agents may be used independently, In order to adjust cross-linking velocity, cross-linking accelerators may be used together. Oxidizers, such as minium and dibenzothiazoylsulfide, may be used as cross-linking accelerators. And as dispersants, metal oxide like zinc oxide, stearic acid, etc. may be used together. As metal oxides, zinc oxide, magnesium oxide, lead oxide, and calcium oxide may be used, and preferably zinc oxide or magnesium oxide may be used. And, dynamic cross-link may be given to thermoplastic resin compositions of the present invention to obtain cross-linked compounds under existence of cross-linking agents.

Various stabilizers, such as age resistors, antioxidant, ozone degradation inhibitors, UV absorbents, and optical stabilizers, may be suitably blended with thermoplastic resin compositions and a molded body containing thermoplastic resin compositions of the present invention as additional components. And, additives, such as antistatic agents, slip agents, internal release agents, colorants, dispersants, anti blocking agents, lubricants, and anticlouding agents, may be blended suitably.

Fillers, such as glass fibers, carbon fibers, metal fibers, glass beads, asbestos, mica, calcium carbonate, titanic acid potassium whiskers, talc, aramid fibers, barium sulfate, glass flakes, and fluororesins, mineral oil derived softeners, such as naphthene oil and paraffin derived mineral oils, etc. may be suitably blended with thermoplastic resin compositions and a molded body containing thermoplastic resin compositions of the present invention as addition components.

Flame retarder may be suitably blended with thermoplastic resin compositions and a molded body containing thermoplastic resin compositions of the present invention as addition components. As examples of flame retarders, inorganic compounds, such as antimony derived flame retarders, aluminum hydroxide, magnesium hydroxide, zinc borate, guanidine derived flame retarders, and zirconium derived flame retarders; phosphates and phosphorus compounds, such as poly phosphoric acid ammonium, ethylene bis-tris (2-cyano ethyl)phosphonium chloride, tris(tribromo phenyl) phosphate, tris(tribromo phenyl) phosphate, and tris(3-hydroxypropyl)phosphine oxide; chlorine derived flame retarders, such as chlorinated paraffin, chlorinated polyolefin, and perchloro cyclopentadecane, bromine derived flame retarders, such as hexabromobenzene, ethylene bisdibromo norbornane dicarboxyimide, ethylene bistetrabromo phthalimide, tetrabromo bisphenol A derivatives, tetrabromo bisphenol S, and tetrabromo dipentaerythritol, and those mixtures may be mentioned.

Foaming agent may be blended with thermoplastic resin compositions and a molded body containing thermoplastic resin compositions of the present invention as an addition component to provide sponge-like products. As examples of foaming agents, body foaming agents, such as sodium bicarbonate, ammonium bicarbonate, and ammonium carbonate; nitroso compounds, such as N,N'-dinitroso pentamethylenetetramine; azo compounds, such as azocarbonamide and azpisobutylonitrile; sulfonylhydrazides, such as benzene sulfonylhydrazine, p,p'-oxy bis(benzene sulfonylhydrazide), toluene sulfonylhydrazide, and toluene sulfonylhydrazide derivatives etc. may be mentioned. And in foaming processing, foaming auxiliary agents may be used suitably. As examples of foaming auxiliary agents, salicylic acid, urea, and their compounds, etc. may be mentioned.

Polar polymers may be added as auxiliary agents for high-frequency fabricating to thermoplastic resin compositions and a molded body containing thermoplastic resin compositions of the present invention. As examples of polar polymers, copolymers or multiple copolymers of ethylene and one or more comonomers selected from the following group of compounds may be mentioned, that is; monocarboxylic acid, such as acrylic acid, methacrylic acid, ethyl acrylic acid, and crotonic acid; dicarboxylic acids, such as maleic acid, fumaric acid, itaconic acid, and citraconic acid; their monoester; acrylic acids, such as methylmethacrylate, methylacrylate, and ethylacrylate; or vinyl esters of saturated carboxylic acid, such as methacrylic acid esters, vinyl acetate, and vinyl propionate, and their ionomers.

In addition to (i) and (ii) that are indispensable component, other resin components, for example, rosin derived resins, polystyrene derived resins, synthetic petroleum resins, coumar one derived resins, phenol derived resins, xylene derived resins, styrene derived resins, isoprene derived resins, etc., may be blended suitably to thermoplastic resin compositions and a molded body containing thermoplastic resin compositions of the present invention, if needed. As rosin derived resins, natural rosins, polymerized rosin, partially and fully hydrogenated rosins; glycerine esters of these various rosins; esterified compounds, such as pentaerythritol esters, ethylene glycol esters, and methyl esters; and further, rosin derivatives modified by disproportionation, fumarization, limization, or by suitably combined methods of these modification may be mentioned. As poly terpene derived resin, homopolymers or copolymers of cyclic terpene, such as α-pinene, β-pinene, and dipentene; terpene-phenol derived resins, such as α-pinene-phenol resins, dipentene phenol resins, terpene-bisphenol resins, etc. that are copolymers of various kinds of above-mentioned terpene and phenol derived compounds, such as phenol and bisphenol; furthermore, aromatic modified terpene resins that are copolymers of the various above-mentioned terpenes and aromatic monomers may be mentioned. As synthetic petroleum resins, $C_5$ fractions and $C_6$ to $C_{11}$ fractions of naphtha cracking oil; homopolymers or copolymers of olefin derived fractions; aliphatic derived petroleum resins, aromatic derived petroleum resins, cycloaliphatic derived petroleum resins, aliphatic-cycloaliphatic copolymerized resins that are hydrogenated compounds of these polymers, etc. may be mentioned.

Furthermore, copolymers of various kinds of above-mentioned naphtha cracked oils and various above-mentioned terpene, copolymerized petroleum resins that are hydrogenated compounds may be mentioned. As $C_5$ fractions of naphtha cracking oils here, methyl butene, such as isoprene, cyclopentadiene, 1,3-pentadiene, 2-methyl-1-butene, and 2-methyl-2-butene; pentenes, such as 1-pentene and 2-pentene; dicyclopentadiene etc. are preferable. As $C_6$ to $C_{11}$ fractions, methyl styrenes, such as indene, styrene, o-, m- and p-vinyltoluene, and α- and β-methylstyrene; methylindene, ethyl indene, vinyl xylene, propenyl benzene, etc. are preferable. In addition, as an olefin derived fractions, butene, hexene, heptene, octene, butadiene, octadiene, etc. are preferable.

As phenol derived resins, alkylphenol resin, alkyl phenol acetylene resins by condensation by alkyl phenol and acetylene, and these modified compounds may be mentioned. Here, as these phenol derived resins, novolak type resins in which phenol is methylolized with acid catalyst, and resol type resins in which phenol is methylolized with alkali catalyst may be mentioned.

As xylene derived resins, xylene-formaldehyde resin that consists of m-xylene and formaldehyde, and modified resin in which a third component is added to the resin to be reacted may be mentioned.

As styrene derived resins, low molecular weight polymer of styrene, copolymerized resin of α-methyl styrene and vinyltoluene, copolymerized resins of styrene, acrylonitrile, and indene, etc. may be mentioned.

As isoprene derived resins, resins obtained by copolymerizing $C_{10}$ cycloaliphatic compounds of dimerized isoprene with $C_{10}$ linear compounds may be mentioned.

In various kinds of above-mentioned resins that give tackiness, rosin derived resins, poly terpene derived resins, synthetic petroleum resins, etc. are preferable. From a viewpoint of transparency of a molded body using olefin derived copolymer compositions obtained, resins with aliphatic and/or cycloaliphatic structure in these resins are more preferable. Here, as especially preferable resins giving tackiness that have aliphatic and/or cycloaliphatic structure: in rosin derived resins partially and fully hydrogenated rosin and those derivatives; in poly terpene derived resins, homopolymers or copolymers of cyclic terpenes; in synthetic petroleum resins, hydrogenated copolymer of aliphatic derived petroleum resin, cycloaliphatic derived petroleum resin, aliphatic-cycloaliphatic copolymerized resins, naphtha cracked oils, and various terpene may be mentioned. These resin components are used independently, or in combination of mixture of two or more kinds. In addition, corresponding commercial materials may be used as resin components.

Thermoplastic resin compositions of the present invention may be used as multilayered materials of two or more layers that have at least one layer consisting of thermoplastic resin compositions of the present invention. Materials of layers in the laminated layers constituting each layer may be the same mutually or may be different from each other. As materials constituting each layer, it is possible to be selected from well-known components of thermoplastic resins, rubbers, and others besides thermoplastic resin compositions of the present invention. As thermoplastic resins among these materials, resins selected from a following group may be used: various ethylene derived resins, various polypropylene derived resins various polybutene derived resins, various polymethylpentene derived resins, polystyrene derived resins; copolymer resins of ethylene and acrylic acid derived monomers; copolymer resins of ethylene and vinyl acetate derived monomers; copolymer resins of ethylene and methacrylic acid derived monomers; acrylate resins, polyester derived resins, polycarbonate derived resins, nylon derived resins, polyvinylalcohol derived resins. As rubbers, various rubber components other than copolymers of the present Invention may be mentioned, for example, ethylene/α-olefin derived copolymer rubbers, ethylene/α-olefin/polyene derived copolymer rubbers, styrene derived rubbers, hydrogenated styrene derived rubbers, diene derived rubbers, and well-known cross linked rubbers may be mentioned. As other components, materials chosen from textiles, nonwoven fabric, etc., various stabilizers, various additives, fillers, mineral oil derived softeners, flame retarders, high-frequency fabricating assistants, rosin derived resins, poly-terpene derived resins, synthetic petroleum resins, coumarone derived resins, phenol derived resins, xylene derived resins, isoprene derived resins, etc. may be mentioned, and these may be blended suitably. And, various kinds of materials containing thermoplastic resin compositions of the present invention may be resin materials that are given cross-link with sulfur cross-linking, peroxide cross-linking, metal ion cross-linking, silane cross-linking, resin cross-linking, etc. by well-known method, and resin materials in which foaming agents are blended to receive sponge processing. In addition, adhesives to provide adhesive property may be inserted to between layers of multilayered materials if needed.

As methods of obtaining thermoplastic resin compositions of the present invention, each component explained above may be kneaded using for example, usual kneading equipment, rubber mills, Brabender mixers, Banbury mixers, pressurized kneaders, ruders, biaxial extruders, etc. As kneading equipment, both sealed system and open system may be used, but equipments by sealed system type that may be substituted by inert gas are preferable. Kneading temperature is a temperature at which all the mixed constitution components are melted, and is usually 160–250 degrees C., and is preferably 180–240 degrees C. Although it is not generally discussed because of dependency on kinds of mixed constituting components, quantity, and kind of kneading equipments, kneading time is usually about 3–10 minutes, when using kneading equipments, such as pressurized kneader and Banbury mixers. In addition, in kneading process, each constitutiing components may be collectively kneaded, and a multi-stage division kneading method in which after some constituting components are kneaded at a first, remaining constituting components are added and kneading is continued is also employable.

It is preferable that thermoplastic resin compositions of the present invention have pellet-like shape in consideration of transfer or transportation. Although known technology may be mentioned as methods of pelletizing of thermoplastic resin compositions, and for example, after uniformly molten, (i) thermoplastic resins and (ii) olefin derived copolymers are extruded by extruder, pellets in a shape of a globular, acylinder, and a lens are obtained by hot cutting or strand cutting. In this case, cutting may be carried out under any condition of air currents, underwater, in air, etc. Strands with dual structure, in which (i) thermoplastic resins as outer layer and (ii) olefin derived copolymers as inner layer are configured, may be obtained, and thus pellets that contain resins with low mutual adhesiveness may be supplied effectively, using equipments with system that can configure two-layered strands (inner layer and outer layer), with different polymers. And, after (i) thermoplastic resins and the (ii) olefin derived copolymers are molten and mixed uniformly, the mixture molded to obtain sheets with rolls etc. may be pelltized into cubic shape by sheet pelletizing machine. Pellets preferably have a length of longest portion of 3 cm or less in size. In the case of pellets with size exceeding this size, measurement error may become larger.

Pellets comprising thermoplastic resin compositions of the present invention may be preferably powdered on their surface with one kind or more of materials, such as calcium carbonate, barium sulfate, silica, talc, stearic acid, and poly olefin powder in the light of inhibition of pellet-bridging phenomenon caused by coagulation. A mount of powdering may be decided based on a size and a form of pellets, and it is preferably 0.05–3 weight parts based on an amount of pellets of thermoplastic resin compositions. Effect of stopping coagulation may be poor if added amount is too small, and if too much, decrease in physical properties and manufacturing cost rise may be caused.

Thermoplastic resin compositions of the present invention are primarily processed into various molding objects, such as pipe and joint, film, sheet, hose, inner tube, etc. using well-known methods, such as extrusion molding, variant extrusion molding, multi-color extrusion molding, covering (with core) extrusion molding, injection molding, compression molding, foamed molding, hollow molding, powder molding, calender molding, kneading processing, and inflation. For example, as an example of powder molding method, the slash molding method, the flow dipping method, electrostatic coating method, powder thermal spraying method, the powder rotational molding method, etc. are mentioned. And, as for molded bodies that consist of thermoplastic resin compositions of the present invention, well-known surface treatment, such as paint and vacuum evaporation, can be performed. Moreover, the above-mentioned primary products may further be processed to obtain commercial products by processing, such as bending, cutting, cut forming, die cutting, die drawing, sculpture, press processing, hot stamping, high-frequency fabricating, ultrasonic processing, lamination, sewing/rolled seaming/hand-knit, vacuum forming, pneumatic molding, adhesion, welding, hair transplantation, lining processing, slit processing, and printing.

Although base material films or sheets of the present invention may be transparent and colorless, coloring or printing may be given to be used.

Although especially manufacturing process of base material sheets or films of the present invention is not limited, for example, after each component is kneaded with dry blend or usual kneading equipment, for example, rubber mill, Brabender mixer, Banbury mixer, pressurized kneader, ruder, biaxial extruder, etc. the material may be processed to obtain laminated films and sheets by inflation method, extruding method by T type dice, uniaxial drawing method, biaxial drawing method, calender roll, etc. Although thickness of films obtained is not especially limited, it is preferably 0.02–2 mm, and more preferably about 0.03–0.2 mm.

Moreover, pressure sensitive adhesive layer may be prepared on at least one face of base material films of the present invention, or sheets to obtain tacky adhesion sheets or films may be provided. This pressure sensitive adhesive is not especially limited, and for example, rubber derived pressure sensitive adhesives, such as natural rubbers, ethylene-α-olefin copolymers, atactic polypropylenes, and propylene-α-olefin copolymers, ethylene-vinyl acetate copolymers, polyamides, polyesters, polycarbonates, poly vinyl ethers, polyvinyl alcohol, polyurethanes, styrene derived block copolymers, polyisobutylene-butyl rubber derivatives, and poly isoprene derivatives; acrylic derived pressure sensitive adhesives, such as graft polymer obtained by polymerization of the acrylics derived monomers, and copolymers with 2-ethyl hexyl acrylate and butyl acrylate as main monomer; silicone derived pressure sensitive adhesives etc. may be used as pressure sensitive adhesives in a form of solvent type, non-solvent type, emulsion type, water-soluble type, etc. Thickness of pressure sensitive adhesives usually has about 0.001–0.2 mm preferably. Moreover, softener, optical stabilizers (UV absorbent, quencher, etc.), antioxidant, anticorrosive, colorant, filler, age resistor, cross-linking agent, etc. may be added. Pressure sensitive adhesive may be coated on base materials by coating machine, and pressure sensitive adhesive layers are formed. In the light of environmental problems, working environment, etc. in these days, pressure sensitive adhesive layers are preferably prepared using a hot-melt coating method on films and sheets of base material. Moreover, in this case, base materials and pressure sensitive adhesive layers may be processed by technologies, such as co-extrusion method and the extrusion coating method (it is also called the extrusion laminating method), using inflation film manufacturing equipment, T die film manufacturing equipment, etc.

Furthermore, when using tacky adhesion sheets or films especially in rolls, it is preferable to reduce an affinity of tacky adhesion sheets or films to opposite side of themselves in the light of what is called releasing-out property, i.e., self-releasing property. For this reason, release coated papers may be inserted or releasing agents may be coated to a face opposite to a side in which pressure sensitive adhesive layer is given on base materials of tacky adhesion sheets or films.

EXAMPLE

Although the following examples describe the present invention still more concretely, these examples are for illustration and do not limit the present invention. [1] Synthesis of Olefin Derived Copolymer Example 1

Copolymerization of ethylene, propylene, 1-butene, and 5-ethylidene-2-norbornene (ENB) was continuously performed using polymerization apparatus made of SUS of 100 L equipped with agitating blades. That is, hexane was continuously supplied as a polymerization solvent from a lower part of polymerization apparatus at the rate of 83 L/hour, and following raw materials were simultaneously supplied at each velocity continuously respectively; ethylene: 2.0 kg/hour; propylene: 8.3 kg/hour: 1-butene: 12.7 kg/hour; and 5-ethylidene-2-norbornene (ENB): 6.3 kg/hour. On the other hand, from upper part of the polymerization apparatus, polymerization liquid was continuously extracted so that the polymerization liquid in the polymerization apparatus might be kept a level of 100 L. As catalysts, dimethyl silyl(tetramethyl cyclopentadienyl)(3-tert-butyl-5-methyl-2-phenoxy)titanium dichloride, triphenylmethyl tetrakis(pentafluoro phenyl)borate, triisobutyl aluminum (henceforth referred to as TIBA) were continuously supplied into the polymerization apparatus at rates of 0.092 g/hour, 2.755 g/hour, and 5.251 g/hour respectively from the lower part of the polymerization apparatus. Moreover, molecular weight regulation was performed by hydrogen. Copolymerization reaction was performed at 50 degrees C. while circulating cooling water in a Jacket attached in exterior of the polymerization apparatus. A small amount of ethanol was added into a polymerization liquid extracted from the polymerization apparatus, and polymerization reaction was stopped. After monomer was stripped off and washed with water, solvent was removed off by steaming in a large amount of water, and thus copolymer was taken out. Copolymer was dried at 80 degrees C. day and night under reduced pressure. Thus ethylene/propylene/1-butene/5-ethylidene-2-norbornene copolymerization was performed at a rate of 2.39 kg/hour by the above operation.

Comparative Examples 1 and 2

In Example 1, except that the amount of monomer added and amount of catalyst added as shown in Table 1 were used, the same method was followed fundamentally and copolymer was obtained. Detailed result is summarized in Table 1.

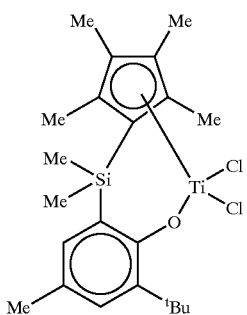

Dimethyl silyl(tetramethyl cyclopentadienyl)(3-tert-butyl-5-methyl-2-phenoxy)titanium dichloride

[2] Analysis of Olefin Derived Copolymer (1) IR Measurement

Copolymer obtained by Example 1 and Comparative examples 1 and 2 were analyzed by IR measurement. Methylene rocking vibration of ethylene at 720 cm$^{-1}$, methyl group rocking vibration originated from methyl branch in propylene at 1154 cm$^{-1}$, and methyl group rocking vibration originated from ethyl branch in 1-butene at 770 cm$^{-1}$ were observed. This shows that copolymerization of each monomer component was carried out.

(2) Intrinsic Viscosity [η]

Measurement of intrinsic viscosity was performed in 135-degree C. tetralin using Ubbelohde viscometer. Sample 300 mg was dissolved in tetralin 100 ml, and 3 mg/ml of solution was prepared. Furthermore, the solution concerned was diluted into concentration of 1/2, 1/3, and 1/5, and each diluted solution was measured in oil thermostat bath at 135 degrees C. (±0.1 degrees C.). For each concentration, measurement was repeated 3 times and acquired value was averaged.

(3) Molecular Weight-distribution Measurement

Molecular weight distribution was measured by gel permeation chromatography (GPC) method (product made by Waters, 150 C/GPC equipment). Following condition was used; elution temperature: 140 degrees C., Used column: Sodex Packed Column A-80M by Showa Denko K.K., molecular weight standard substance: polystyrene (made by TOSOH CORP. molecular weight 68–8400000). Weight average molecular weight converted into polystyrene is defined as (Mw) and number average molecular weight as (Mn), and this ratio (Mw/Mn) is defined as molecular weight distribution. About 5 mg of measurement sample polymer was dissolved in o-dichlorobenzene 5 ml to obtain a solution with a concentration of about 1 mg/ml. Obtained sample solution 400 μl was injected. Elution solvent flow velocities were 1.0 ml/min, and detection was carried out by a refractive index detecting element.

(4) Differential Scanning Calorimeter (DSC) Measurement

Measurement was performed at the rate of 10 degrees C./min in both of temperature rising and constant process using a differential scanning calorimeter (DSC 220C by SEIKO Electronic Ind., Co.)

(5) Measurement of 5-ethylidene-2-norbornene (ENB) Content

Olefin derived copolymer was molded by heat pressing into a film shape of thickness of 0.5 mm. Subsequently, using infrared spectrometer, peak transmittancy (wave number 1650 cm$^{-1}$) originated from 5-ethylidene-2-norbornene origin was obtained, and 5-ethylidene-2-norbornene content in olefin derived copolymer was calculated.

[3] Evaluation of Thermoplastic Resin Composition

After preliminary kneading was performed for 2 minutes on condition that temperature of 200 degrees C., and screw rotational frequency 10 rpm using plasticorder PLV 151 type by Brabender company using combinations shown in Tables 2–5, kneading is performed for 10 minutes by 80 rpm. Press molding was carried out based on JIS K6758, and sheets of the composition were prepared.

Characteristics of thermoplastic resin compositions described in Example were measured by the following methods.

(1) Tensile Test JIS K6251

Specimen form dumbbell-like No. 3 type

Elongation velocity 200 mm/min

Number of specimen 3

Result of irregular low elongation cutting is omitted in tensile elongation at break EB (%). Result which shows tensile elongation at break of 80% or less of median of measurement result was omitted, and numerical value to which arithmetic mean of the remaining measurement results is carried out was adopted.

(2) Haze JIS K7105 Method.

Press sheet of thickness of 1 mm was measured.

(3) Heat Run Test:

Except that examination temperature is set at 110 degrees C., and examination time as 100 hours, examination was carried out based on air heating aging test (6.3) of JIS K6301 "6. Aging test." Test pieces were hung down and heated in testing machine tub, and the pieces hung down were kept so that they did not touch each other of touch any portion of wall in the testing machine tub.

(4) Hardness: ASTM D2240

(5) Surface Character Stability:

Generating state of stickiness or cloudiness in the surface of the sample of before and after (3) heat run test was Judged.

1: Stickiness and cloudiness observed: Judgment X

2: Cloudyness observed: Judgment Δ

3: Neither stickiness nor cloudiness observed: Judgment ○

(6) Resistance to Whitening:

Molded body of 1 mm thickness was cut by 1 cm×5 cm, and grade of whitening after bent at an angle of 180 degrees was observed and judged by viewing.

1: Whitening observed: Judgment X

2: No whitening observed: Judgment ○

[4] Calculation

Relationship between an tensile elongation at break EB (%) and a weight percentage (Pa) of olefin derived copolymer in resin composition was processed by curvilinear regression in thermoplastic resin compositions obtained in Examples 2–7 in which olefin derived copolymers of the present invention and polypropylene derived resins were blended, and polypropylene resin shown in Example 8. The following quintic regression was obtained. Rate of contribution ($R^2$) showed 0.9997.

$$EB = 82108 \times Pa^5 - 128621 \times Pa^4 + 78018 \times Pa^3 - 23605 \times Pa^2 + 3754.3 \times Pa + 539.94 \quad \text{(expression 5)}$$

(Expression 5) was processed by linear regression in an area of Pa=0.20–0.60, and an area of Pa=0.30–0.50 using method of least squares, and, as a result, multiple correlation coefficients R[2/6] and R[3/5], gradient S[2/6], and gradient S[3/5] were obtained. In addition, in linear regression, as Pa, in section of Pa=0.20–0.60, relationship of 41 points that were obtained by substituting numerical values with 0.01 units containing 0.20 and 0.60 for (eq5) was used, and in section of Pa=0.30–0.50, relationship of 21 points that were obtained by substituting numerical value of 0.01 units containing 0.30 and 0.50 for (expression 5) were used.

Multiple correlation coefficient R[2/6], and R[3/5] gave the following values, and satisfied the relationship of (expression 1).

$$R[2/6]=0.4804$$

$$R[3/5]32\ 0.8993$$

$$R[3/5]-R[2/6]=0.4189\ R[3/5]-R[2/6]\geq 0.15 \quad \text{(expression 1)}$$

Gradient S[2/6] and S[3/5] gave the following values, and satisfied the relationships of (expression 2) and (expression 3).

$$S[2/6]=54.29$$

$$S[2/6]\geq -800 \quad \text{(expression 2)}$$

$$S[2/6]-70.32$$

$$S[3/5]-S[2/6]=-124.61$$

$$S[3/5]-S[2/6\}\leq -50 \quad \text{(expression 3)}$$

The same calculation method was used and each parameter value was calculated from relationships between tensile elongation at break EB (%) and weight percentage (Pa) of olefin derived copolymers in resin composition (Table 6), in thermoplastic resin compositions of Comparative examples 3–8 and Comparative examples 9–14 in which olefin derived copolymers of Comparative example 1 and Comparative example 2 and polypropylene derived resins were blended, and polypropylene resin shown in Example 8.

Results showed that in thermoplastic resin compositions obtained using olefin derived copolymers of the present invention, low hardness was realized, and whitening by bending was not observed, and high transparency was demonstrated, and the compositions were confirmed to be materials showing no aggravation of quality in surface property after heat run test.

TABLE 1

|  |  | Example 1 Run-1 | Comparative example 1 Run-2 | Comparative example 2 Run-3 |
|---|---|---|---|---|
| Polymerization temperature | °C. | 50 | 55 | 50 |
| Ethylene | Kg/h | 2.0 | 2.0 | 5.0 |
| Propylene | Kg/h | 8.3 | 8.3 | 8.3 |
| 1-butene | Kg/h | 12.7 | 12.7 | 12.7 |
| *1 ENB | Kg/h | 6.3 | 0 | 0 |
| *2 (f) | g/h | 5.251 | 1.584 | 1.584 |
| *3 (g) | g/h | 2.755 | 0.276 | 0.276 |
| *4 (h) | g/h | 0.092 | 0.018 | 0.018 |
| ENB content | Iodine value | 28 | 0 | 0 |
| Crystal melting point | °C. | None | None | None |
| Amount of crystal melting calorie | mj/mg | None | None | None |
| Crystallization temperature | °C. | None | None | None |
| Amount of heat of crystallization | mj/mg | None | None | None |

TABLE 1-continued

|  |  | Example 1 Run-1 | Comparative example 1 Run-2 | Comparative example 2 Run-3 |
|---|---|---|---|---|
| Intrinsic viscosity [η] | dl/g | 1.0 | 1.0 | 1.0 |
| GPC Mw/Mn |  | 2.2 | 2.2 | 2.2 |
| Tensile strength at break (JIS K 6251) | MPa | 0.02 | 0.12 | 0.08 |

*1 ENB: 5-ethylidene-2-norbornene
*2 (f): triisobutyl aluminum
*3 (g): triphenylmethyl tetrakis(pentafluorophenyl)borate
*4 (h): dimethylsilyl(tetramethyl cyclopentadienyl)(3-tert-butyl-5-methyl-2-phenoxy)titanium dichloride

TABLE 2

|  |  | Example | | | |
|---|---|---|---|---|---|
|  |  | 2 | 3 | 4 | 5 |
| Run-1 | wt % | 20 | 30 | 40 | 50 |
| PP-1 | wt % | 80 | 70 | 60 | 50 |
| Pa |  | 0.20 | 0.30 | 0.40 | 0.50 |
| Tensile elongation at break (JIS K 6251) | % | 790 | 810 | 800 | 800 |
| Surface character stability |  |  |  |  |  |
| Before heat run test |  | — | — | — | ○ |
| After heat run test |  | — | — | — | ○ |
| Haze (1 mm thickness) | % | — | — | — | 30.7 |
| Hardness (Shore D) |  | — | — | — | 42.7 |
| Resistance to whitening |  | — | — | — | ○ |

PP-1: Propylene ethylene random copolymer resin containing ethylene 4.9 weight % that has a character in which MI shows 0.88 (g/10 min) under a condition of 230 degree C. and 2.16 kg load, and 20-degree C. xylene soluble component shows 5.2%

TABLE 3

|  |  | Example | | |
|---|---|---|---|---|
|  |  | 6 | 7 | 8 |
| Run-1 | wt % | 60 | 70 | 0 |
| PP-1 | wt % | 40 | 30 | 100 |
| Pa |  | 0.60 | 0.70 | 0.00 |
| Tensile elongation at break (JIS K 6251) | % | 860 | 1280 | 540 |
| Surface character stability |  |  |  |  |
| Before heat run test |  | — | ○ | ○ |
| After heat run test |  | — | ○ | ○ |
| Haze (1 mm thickness) | % | — | 35.7 | 56.9 |
| Hardness (Shore D) |  | — | 20.7 | 63.1 |
| Resistance to whitening |  | — | ○ | X |

PP-1: Propylene ethylene random copolymer resin containing ethylene 4.9 weight % that has a character in which MI shows 0.88 (g/10 min) under a condition of 230 degree C. and 2.16 kg load, and 20-degree C. xylene soluble component shows 5.2%

TABLE 4

|  |  | Comparative example | | | | | |
|---|---|---|---|---|---|---|---|
|  |  | 3 | 4 | 5 | 6 | 7 | 8 |
| Run-2 | wt % | 20 | 30 | 40 | 50 | 60 | 70 |
| PP-1 | wt % | 80 | 70 | 60 | 50 | 40 | 30 |
| Pa |  | 0.20 | 0.30 | 0.40 | 0.50 | 0.60 | 0.70 |
| Tensile elongation at break (JIS K 6251) | % | 880 | 840 | 890 | 880 | 930 | 1610 |
| Surface character stability |  |  |  |  |  |  |  |
| Before heat run test |  | — | — | — | — | — | ○ |
| After heat run test |  | — | — | — | — | — | X |
| Haze (1 mm thickness) | % | — | — | — | — | — | 20.9 |
| Hardness (Shore D) |  | — | — | — | — | — | 22.0 |
| Resistance to whitening |  | — | — | — | — | — | ○ |

PP-1: Propylene ethylene random copolymer resin containing ethylene 4.9 weight % that has a character in which MI shows 0.88 (g/10 min) under a condition of 230 degree C. and 2.16 kg load, and 20-degree C. xylene soluble component shows 5.2%

TABLE 5

|  |  | Comparative example | | | | | |
|---|---|---|---|---|---|---|---|
|  |  | 9 | 10 | 11 | 12 | 13 | 14 |
| Run-3 | wt % | 20 | 30 | 40 | 50 | 60 | 70 |
| PP-1 | wt % | 80 | 70 | 60 | 50 | 40 | 30 |
| Pa |  | 0.20 | 0.30 | 0.40 | 0.50 | 0.60 | 0.70 |
| Tensile elongation at break (JIS K 6251) | % | 780 | 760 | 640 | 560 | 430 | 370 |
| Surface character stability |  |  |  |  |  |  |  |
| Before heat run test |  | — | — | — | — | — | ○ |
| After heat run test |  | — | — | — | — | — | ○ |
| Haze (1 mm thickness) | % | — | — | — | — | — | 90.3 |
| Hardness (Shore D) |  | — | — | — | — | — | 16.3 |
| Resistance to whitening |  | — | — | — | — | — | X |

PP-1: Propylene ethylene random copolymer resin containing ethylene 4.9 weight % that has a character in which MI shows 0.88 (g/10 min) under a condition of 230 degree C. and 2.16 kg load, and 20-degree C. xylene soluble component shows 5.2%

TABLE 6

|  | Run-1 + PP | Run-2 + PP | Run-3 + PP |
|---|---|---|---|
| R[2/6] | 0.4804 | 0.7897 | 0.9893 |
| R[3/5] | 0.8993 | 0.9140 | 0.9979 |
| R[3/5] − R[2-6] | 0.4189 | 0.1243 | 0.0086 |
|  | (○) | (X) | (X) |
| S[2/6] | 54.29 | 133.83 | −939.91 |
|  | (○) | (○) | (X) |

As is described above according to the present invention, thermoplastic resin compositions with outstanding flexibility, transparency, resistance to whitening, scratch resistance, and tensile elongation characteristics, and excellent balance of flexibility, heat resistance, and weather resistance, and outstanding surface character stability are provided.

Availability in Industry

Thermoplastic resin compositions of the present invention may be used with the outstanding feature in many usage, for example, vehicles parts, electrical and electric equipment parts, electric wires, building materials, agricultural and fishery and horticulture articles, chemical industrial use articles, engineering works materials, industry and industrial materials, furniture, stationeries, miscellaneous business goods article clothes, container and packaging articles, toys, leisure articles, medical application articles, etc. As vehicles parts, for example, automobile interior outer layer materials, such as interior design panels, doors, pillars, and air bag covers; automobile exterior parts, bicycle parts, etc. such as, over fenders, crowding panels, roof rails, and side malls may be mentioned. As electrical and electric equipment parts, for example, electrical and instrument parts, electronic parts, weak electric current parts, household electric appliances components, refrigerator articles, lighting apparatus, various covers for electricity, etc. may be mentioned. As electric wires, plastics cables, insulated conductors, electric wire protection materials, etc. may be mentioned. As building materials, for example, wall and ceiling material uses, such as ribs, baseboard, panels, and tarpaulins; roofing material uses, such as corrugated plates, water pipes, and roof ground materials; floors use, such as threshold material and tile components; waterproofing uses, such as joints, joint sticks, and water proofing sheets; equipment part uses, such as ducts, cable ducts, prefab components, and septic tanks; structure and fixtures material uses, such as edges for construction, gaskets for construction, carpet stoppers, angles, and louvers; industrial materials uses, such as joiners and cure sheets may be mentioned. As agricultural, fishery, and horticulture articles, house use for agriculture etc. is mentioned, for example. As industrial materials, for example, machine covers, machine parts, packing, gaskets, flanges, leather canvas, bolts, nuts, valves, films for metal protection, etc. may be mentioned. As furniture, cabinets, stools, sofas, mats, curtains, tablecloths, etc. may be mentioned, for example. As stationeries, card cases, writing implement cases, accessories, key cases, money card cases, stickers, labels, book jackets, note covers, binders, notebooks, covers, files, cards, commuter's tickets, underlay, holds, magazine trays, albums, templates, writing implement axis, etc. may be mentioned. As daily necessaries and a miscellaneous goods article, bath lids, drainboards, buckets, clothes covers, bedding cases, umbrellas, umbrella covers, reed screens, needlework tools, shelf boards, shelf receptacles, frames, aprons, trays, tapes, strings, belts, bags, etc. may be mentioned, for example. As clothes, raincoat, raincoats, rain gear sheets, child leather jackets, shoes, shoes covers, foot wears, gloves, ski wears, hats, and sub materials for hats etc. may be mentioned. As container and a packaging articles, food containers, garments packaging articles, packing/packaging materials, cosmetics bottles, cosmetics containers, medicine bottles, food bottles, bottles for chemicals, detergent bottles, containers, caps, food packs, laminating films, shrink films for industry, business-use lap films. etc. may be mentioned, for example. As a medical application articles, transfusion bags, continuation carrying type peritoneal dialysis bags, blood bags, etc. may be mentioned, for example.

Thermoplastic resin compositions of the present invention may be used for base material sheets or films, and tacky adhesion sheets or films that are constituted by the base material sheets or films as indispensable components, utilizing excellent balance of flexibility, heat resistance, and excellent characteristics in weather resistance, and surface character stability, flexibility, transparency, resistance to whitening. In detail, they may be used in variable fields, such as, surface protection film for prevention of blemish and soil at the time of storage or transportation of stainless steel and aluminum boards, makeup ply woods, sheet steels, resin boards, glasses, construction materials, home electronics, precision instruments, cars, etc., and prevention of getting damaged at the time of secondary processing of bending processing or press processing; and base material sheets or films that can be used for constituting tape for fixation or union etc. at the time of packaging and packing; and further tacky adhesion sheets or films comprising the base material sheets or films and pressure sensitive adhesive layers or film, etc.

What is claimed is:

1. An olefin derived copolymer satisfying the following requirements (1) and (2):
   (1) strength at breakage of the olefin derived copolymer measured according to JIS K6251 is not more than 2.0 MPa, and
   (2) a resin composition consisting of the olefin derived copolymer and a polypropylene derived resin, which resin contains a 20° C. xylene-soluble part in an amount of not more than 20% by weight, satisfies the following expressions, (expression 1) and (expression 2), $R[3/5]-R[2/6] \geq 0.15$ (expression 1)

$S[2/6] \geq -800$ (expression 2)

wherein R[3/5] and R[2/6] are multiple correlation coefficients of a primary straight line obtained by a method consisting of the steps of:
   (i) plotting a content by weight (Pa) of the olefin derived copolymer contained in the resin composition as a horizontal axis, and plotting an elongation at breakage, EB (%) measured according to JIS K6251, of the resin composition as a vertical axis to obtain a curve,
   (ii) quintic multiple-regressing the above-obtained curve to obtain a multiple regression formula, which formula essentially contains data of at least seven Pa points, Pa=0.00, 0.20, 0.30, 0.40, 0.50, 0.60 and 0.70, and further in case of containing more than seven Pa points, all the Pa values essentially have mutually constant intervals of not more than 0.10; and
   (iii) approximating a multiple regression curve in the sectional regions of Pa=0.30–0.50 and Pa=0.20–0.60 of the above-obtained multiple regression formula according to a method of least square to obtain the above-mentioned primary straight line and wherein
   S[2/6] is a gradient of a primary straight line (formula) obtained by approximating the above-mentioned multiple regression curve in the sectional region of Pa=0.20–0.60 according to a method of least square.

2. A thermoplastic resin composition comprising:
   (i) 1–99% by weight of a thermoplastic resin, and
   (ii) 99–1% by weight of the olefin derived copolymer according to claim 1.

3. A thermoplastic resin composition comprising the following (A) and (B) as essential components:
   (A) the thermoplastic resin composition according to claim 2, and
   (B) at least one resin selected from the group consisting of a rosin derived resin, a poly terpene derived resin, a synthetic petroleum resin, a coumarone derived resin, a phenol derived resin, a xylene derived resin, a styrene derived resin and an isoprene derived resin.

4. A pellet comprising the thermoplastic resin composition according to claim 2 or 3 as an essential component.

5. A molded article comprising the thermoplastic resin composition according to claim 2 or 3 as an essential component, which article is molded according to any one molding method selected from the group consisting of an extrusion molding method, a profile extrusion molding method, a multi-color extrusion molding method, a covering (with core) extrusion molding method, an injection molding method, a compression molding method, an expansion molding method, a blow molding method, a powder molding method, a calender molding method, a kneading processing and an inflation molding method.

6. A sheet or a film comprising the thermoplastic resin composition according to claim 2 or 3.

7. A laminated material, which comprises at least one layer containing the thermoplastic resin composition according to claim 2 or 3.

8. A base material sheet or a base material film comprising the thermoplastic resin composition according to claim 2 or 3.

9. An adhesive sheet or an adhesive film comprising the base material sheet or the base material film according to claim 8, which sheet or film has a pressure sensitive adhesive layer on at least one face thereof.

10. An olefin derived polymer according to claim 1, wherein said expression 1 is:

$$R[3/5]-R[2/6] \geq 0.20.$$

11. An olefin derived polymer according to claim 1, wherein said expression 1 is:

$$R[3/5]-R[2/6] \geq 0.25.$$

12. An olefin derived polymer according to claim 1, wherein said expression 1 is:

$$R[3/5]-R[2/6] \geq 0.30.$$

13. An olefin derived polymer according to claim 1, wherein said expression 1 is:

$$R[3/5]-R[2/6] \geq 0.35.$$

14. An olefin derived polymer according to claim 1, wherein said expression 1 is:

$$R[3/5]-R[2/6] \geq 0.40.$$

15. An olefin derived polymer according to claim 1, wherein said expression 2 is:

$$S[2/6] \geq -200.$$

16. An olefin derived polymer according to claim 1, wherein said expression 2 is:

$$S[2/6] \geq -100.$$

17. An olefin derived polymer according to claim 1, wherein said expression 2 is:

$$S[2/6] \geq -50.$$

18. An olefin derived polymer according to claim 1, wherein said olefin derived copolymer is selected from the group consisting of:

(1) olefin derived copolymers of ethylene and α-olefin with 3–20 carbons as indispensable monomers with which one or more monomer components chosen from polyene compounds, cyclic olefins, and vinyl aromatic compounds are arbitrarily copolymerized, (2) olefin derived copolymers of ethylene and α-olefin with 4–20 carbons as indispensable monomers with which one or more kinds of monomer components chosen from polyene compounds, cyclic olefins, and vinyl aromatic compounds are arbitrarily copolymerized, (3) olefin derived copolymers in which ethylene, propylene, and α-olefins with 4–20 carbons are indispensable monomers with which one or more kinds of monomer components chosen from polyene compounds, cyclic olefins, and vinyl aromatic compounds are arbitrarily copolymerized, (4) olefin derived copolymers of propylene and α-olefins with 4–20 carbons as indispensable monomers with which one or more monomer components chosen from polyene compounds, cyclic olefins, and vinyl aromatic compounds are arbitrarily copolymerized, (5) olefin derived copolymers that consist of monomer units based on ethylene and α-olefins with 4–20 carbons, (6) olefin derived copolymers that consist of monomer units based on ethylene α-olefins with 4–20 carbons and polyene compounds, (7) olefin derived copolymers that consist of monomer units based on ethylene, α-olefins with 4–20 carbons, and cyclic olefin compounds, (8) olefin derived copolymers that consist of monomer units based on ethylene, α-olefins with 4–20 carbons, and vinyl aromatic compounds, (9) olefin derived copolymers that consist of monomer units based on ethylene, α-olefins with 4–20 carbons, polyene compounds, and vinyl aromatic compounds,

(10) olefin derived copolymer that consist of monomer units based on ethylene, propylene, and α-olefins with 4–20 carbons,

(11) olefin derived copolymers that consist of monomer units based on ethylene, propylene, α-olefins with 4–20 carbons, and polyene compounds,

(12) olefin derived copolymers that consist of monomer units based on ethylene, propylene, α-olefins with 4–20 carbons, and cyclic olefin compounds,

(13) olefin derived copolymers that consist of monomer units based on ethylene, propylene, α-olefins with 4–20 carbons, and vinyl aromatic compounds,

(14) olefin derived copolymers that consist of monomer units based on ethylene, propylene, α-olefins with 4–20 carbons, polyene compounds, and vinyl aromatic compounds,

(15) olefin derived copolymers obtained by copolymerizing propylene and α-olefins with 4–20 carbons,

(16) olefin derived copolymers that consist of monomer units based on propylene, α-olefins with 4–20 carbons, and polyene compounds,

(17) olefin derived copolymers that consist of monomer Units based on propylene, α-olefins with 4–20 carbons, and cyclic olefin compounds,

(18) olefin derived copolymers that consist monomer units based on propylene, α-olefins with 4–20 carbons, and vinyl aromatic compounds, and

(19) olefin derived copolymers that consist of monomer units based on propylene, α-olefins with 4–20 carbons, polyene compounds, and vinyl aromatic compounds.

* * * * *

UNITED STATES PATENT AND TRADEMARK OFFICE
CERTIFICATE OF CORRECTION

PATENT NO.    : 6,858,676 B1
DATED         : February 22, 2005
INVENTOR(S)   : Hirofumi Johoji et al.

It is certified that error appears in the above-identified patent and that said Letters Patent is hereby corrected as shown below:

<u>Title page,</u>
Item [22], PCT Filed, should read
-- [22]  PCT Filed:     Jul. 17, 2000 --

Signed and Sealed this

Thirty-first Day of May, 2005

JON W. DUDAS
*Director of the United States Patent and Trademark Office*